United States Patent
Qu

(10) Patent No.: US 12,405,698 B2
(45) Date of Patent: Sep. 2, 2025

(54) DISPLAY METHOD AND APPARATUS, AND ELECTRONIC DEVICE

(71) Applicant: VIVO MOBILE COMMUNICATION CO., LTD., Dongguan (CN)

(72) Inventor: Jinxia Qu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/097,488

(22) Filed: Jan. 16, 2023

(65) Prior Publication Data

US 2023/0168785 A1   Jun. 1, 2023

Related U.S. Application Data

(63) Continuation of application No. PCT/CN2021/106733, filed on Jul. 16, 2021.

(30) Foreign Application Priority Data

Jul. 17, 2020   (CN) .......................... 202010692833.4

(51) Int. Cl.
*G06F 3/04847* (2022.01)
*G06F 3/0481* (2022.01)

(52) U.S. Cl.
CPC ........ *G06F 3/0481* (2013.01); *G06F 3/04847* (2013.01)

(58) Field of Classification Search
CPC ................ G06F 3/04847; G06F 3/0481
See application file for complete search history.

(56) References Cited

U.S. PATENT DOCUMENTS

| 9,369,537 | B1 | 6/2016 | Mathew et al. |
| 2010/0199347 | A1 | 8/2010 | Aoki et al. |
| 2019/0220290 | A1 | 7/2019 | Yu |
| 2019/0347180 | A1 | 11/2019 | Cranfill et al. |
| 2019/0347181 | A1* | 11/2019 | Cranfill ............... G06F 11/3013 |
| 2019/0369699 | A1* | 12/2019 | Pathak .................. G06F 1/3206 |
| 2020/0210549 | A1 | 7/2020 | Gupta et al. |

(Continued)

FOREIGN PATENT DOCUMENTS

| CN | 103116439 A | 5/2013 |
| CN | 104615349 A | 5/2015 |
| CN | 105893019 A | 8/2016 |

(Continued)

OTHER PUBLICATIONS

International Search Report issued in corresponding International Application No. PCT/CN2021/106733, mailed Sep. 28, 2021, 6 pages.

(Continued)

*Primary Examiner* — Andrea C Leggett
(74) *Attorney, Agent, or Firm* — IPX PLLC

(57) ABSTRACT

This application provides a display method and apparatus, and an electronic device. The display method includes: receiving a first input; and displaying a target user screen in response to the first input. A target element of the target user screen is associated with usage information of a target object. The target user screen includes at least one of a Lock Screen, a standby screen, or a prompt screen. The usage information includes at least one of used duration or remaining available duration.

21 Claims, 19 Drawing Sheets

(56) References Cited

U.S. PATENT DOCUMENTS

2021/0344718 A1* 11/2021 Raleigh ................ H04W 12/06
2021/0349619 A1* 11/2021 Crowley ............... G06F 1/3215

FOREIGN PATENT DOCUMENTS

| | | |
|---|---|---|
| CN | 105912210 A | 8/2016 |
| CN | 106293445 A | 1/2017 |
| CN | 107277232 A | 10/2017 |
| CN | 109597543 A | 4/2019 |
| CN | 109783169 A | 5/2019 |
| CN | 109961272 A | 7/2019 |
| CN | 110471581 A | 11/2019 |
| CN | 110968239 A | 4/2020 |
| CN | 111857476 A | 10/2020 |
| EP | 2991328 A | 3/2016 |

OTHER PUBLICATIONS

First Office Action issued in related Chinese Application No. 202010692833.4, mailed Jun. 8, 2021, 10 pages.
Extended European Search Report issued in related European Application No. 21841414.2, mailed Jun. 14, 2024, 7 pages.

\* cited by examiner

The use time that you set arrives, and the mobile phone has been locked

Reset time >

DISPLAY METHOD AND APPARATUS, AND ELECTRONIC DEVICE

CROSS-REFERENCE TO RELATED APPLICATIONS

This application is a continuation of International Application No. PCT/CN2021/106733, filed on Jul. 16, 2021, which claims priority to Chinese Patent Application No. 202010692833.4 filed in China on Jul. 17, 2020. The entire contents of each of the above-referenced applications are expressly incorporated herein by reference.

TECHNICAL FIELD

This application relates to the field of communications technologies, and in particular, to a display method and apparatus, and an electronic device.

BACKGROUND

With the development of electronic devices, the electronic device can achieve more and more functions. For example, the user may customize the use duration of the electronic device, such as use duration of the screen, use duration of the application program, and the like, to limit the user from using the screen and the application program. Currently, when setting the use duration of the screen, the following interfaces need to be enabled layer by layer: a Setting interface and a Screen Time setting interface. In the Screen Time setting interface, use duration of the electronic device, use duration of at least one application program, a sleep time (limiting the use of applications to sleep easily), and the like to be limited may be set. For example, after setting the use duration of the application program to be limited, the user needs to enable the following in turn to check the remaining available duration of the application program: the Setting interface and the Application Limit interface. If there are a large quantity of applications with limited use duration, it is necessary to further search usage information of a corresponding application program in the Application Limit interface, such as the remaining available time. This operation process of checking the usage information is relatively cumbersome.

SUMMARY

Embodiments of this application aim to provide a display method and apparatus, and an electronic device.

This application is implemented as follows.

According to a first aspect, an embodiment of this application provides a display method, including:
receiving a first input; and
displaying a target user screen in response to the first input, where a target element of the target user screen is associated with usage information of a target object, where
the target user screen includes at least one of a Lock Screen, a standby screen, and a prompt screen; and the usage information includes at least one of used duration and remaining available duration.

According to a second aspect, an embodiment of this application provides a display apparatus, including:
a first receiving module, configured to receive a first input; and
a first response module, configured to display a target user screen in response to the first input, where a target element of the target user screen is associated with usage information of a target object, where
the target user screen includes at least one of a Lock Screen, a standby screen, and a prompt screen; and the usage information includes at least one of used duration and remaining available duration.

According to a third aspect, an embodiment of this application provides an electronic device, where the electronic device includes a processor, a memory, and a program or an instruction stored in the memory and executable on the processor, and when the program or the instruction is executed by the processor, steps of the method according to the first aspect are implemented.

According to a fourth aspect, an embodiment of this application provides a computer readable storage medium, where the readable storage medium stores a program or an instruction, and when the program or the instruction is executed by a processor, steps of the method according to the first aspect are implemented.

According to a fifth aspect, an embodiment of this application provides a chip, where the chip includes a processor and a communications interface, the communications interface is coupled to the processor, and the processor is configured to run a program or an instruction, to implement the method according to the first aspect.

In the embodiments of this application, the target user screen is displayed by receiving the first input and being in response to the first input, where the target element of the target user screen is associated with the usage information of the target object. In this way, the user may learn the usage information of the target object through at least one target user screen of the displayed Lock Screen, standby screen, and prompt screen, such as learning at least one of the used duration and the remaining available duration. This avoids the cumbersome process of enabling a plurality of user screens layer by layer to check the usage information, thus simplifying the user operation.

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and a character "/" generally represents an "or" relationship between associated objects.

With reference to the accompanying drawings, the display method provided in the embodiments of this application is described in detail by using specific embodiments and application scenarios.

Figure 1:
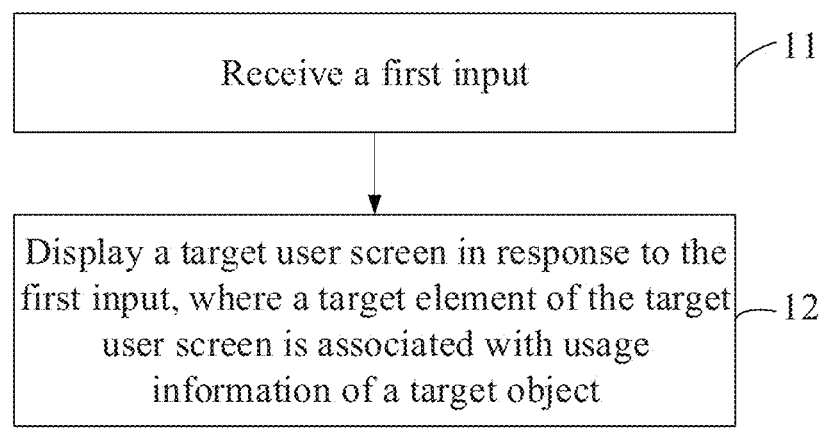
FIG. 1 is a first flowchart of a display method according to an embodiment of this application.

As shown in FIG. 1, this embodiment of this application provides a display method, including the following steps.

Step 11: Receive a first input.

Step 12: Display a target user screen in response to the first input, where a target element of the target user screen is associated with usage information of a target object.

The target user screen includes at least one of a Lock Screen, a standby screen, and a prompt screen; and the usage information includes at least one of used duration and remaining available duration.

In some embodiments, the receiving a first input may include receiving a first input from the user fora display screen or receiving a first input from the user for a physical button.

For example, receiving a first sub-input from the user for a power button, and displaying the Lock Screen in response to the first sub-input; or receiving a second sub-input from the user for a virtual Lock Screen button on the display screen, and displaying the Lock Screen in response to the second sub-input; or receiving a third sub-input from the user for a Home button, and displaying the standby screen in response to the third sub-input; or receiving a fourth sub-input from the user for a virtual Home button on the display screen, and displaying the Lock Screen in response to the fourth sub-input; or receiving a fifth sub-input from the user for the display screen in line with a predetermined operation, and displaying the prompt screen in response to the fifth sub-input, where the predetermined operation may include at least one of a predetermined sliding direction, a predetermined sliding trajectory, predetermined operation duration, a predetermined operation pressure, a predetermined operation area, and a predetermined finger operation (such as an single-finger operation or a multi-finger operation).

In some embodiments, the standby screen is a screen displayed after the user operates the Home button (the physical button or the virtual button), or it can also be understood as a screen displayed after minimizing screens of all programs.

In some embodiments, the target object may be an application program, physical hardware, and the like, where the physical hardware may include but is not limited to a display screen, a camera, a microphone, a speaker, and the like.

In some embodiments, the usage information may be the used duration of the target object in a preset period. In this way, the target element in the target user screen may be used to indicate the used duration of the target object in the preset period, which is convenient for the user to quickly learn the usage of the target object, so that the user may perform corresponding management based on the usage of the target object, such as adjusting a position of an application icon of the target object based on the usage of the target object, setting total limited use duration based on the usage of the target object, deleting the target object based on the usage of the target object, or the like. This is not limited in the embodiments of this application.

In some embodiments, the usage information may also be at least one of the used duration and the remaining available duration corresponding to the target object whose use duration is limited. In this way, the target element in the target user screen is used to indicate at least one of the used duration and the remaining available duration of the target object for which the limited use duration is set, which is convenient for the user to quickly learn the usage of the target object.

In some embodiments, the user may customize, in advance, information that the target object is limited for using, such as the maximum use duration, the type of the limited time (working day and non-working day), and the like.

Figure 2:
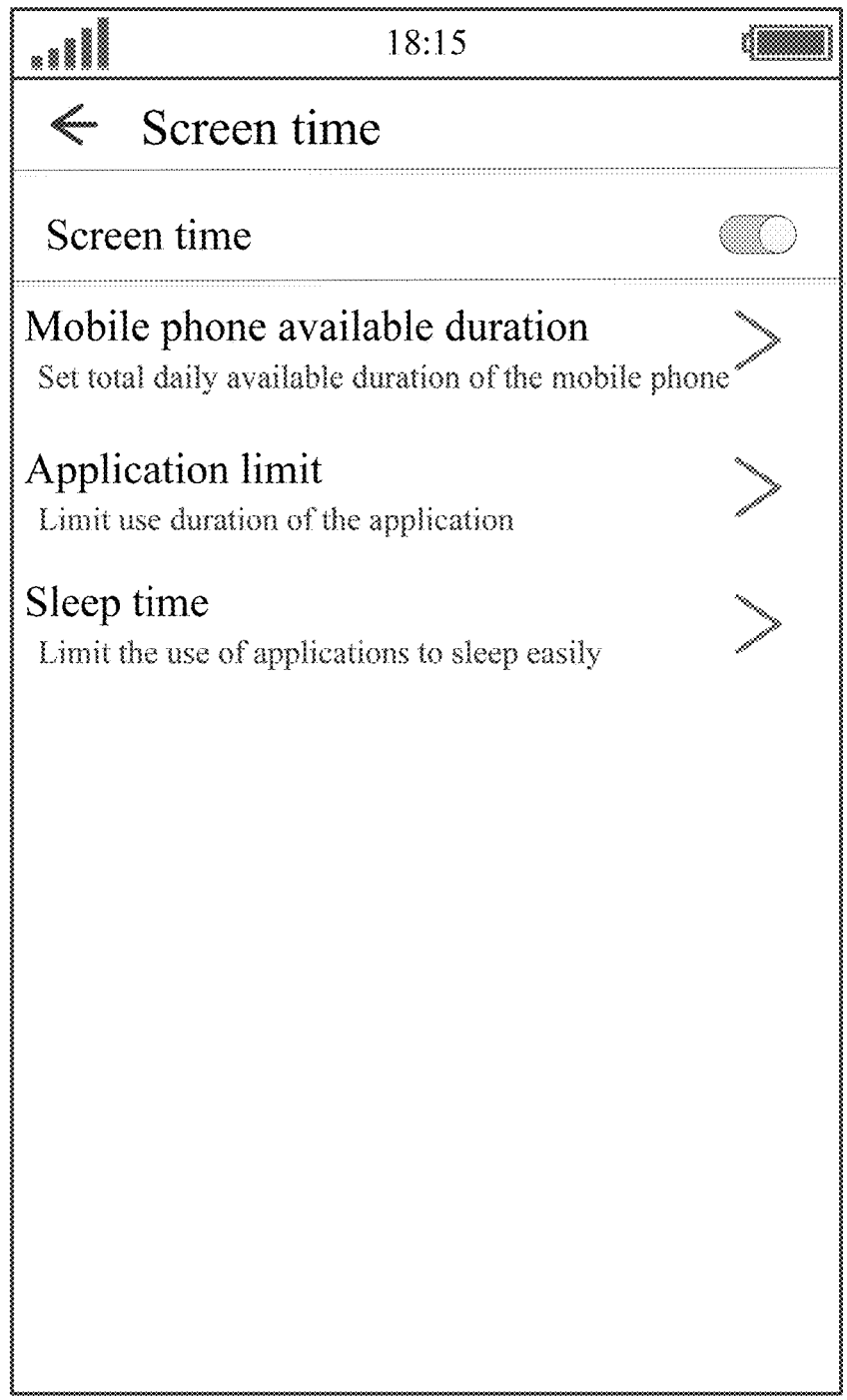
FIG. 2 is a schematic diagram of a Screen Time setting interface according to an embodiment of this application.

Taking the mobile phone as an example, the user may enter the Screen Time setting interface through a "Screen Time" submenu in the setting interface, as shown in FIG. 2. In the Screen Time setting interface, the user may set the available duration of the mobile phone, the application usage limit, the sleep time, and the like.

Figure 3:
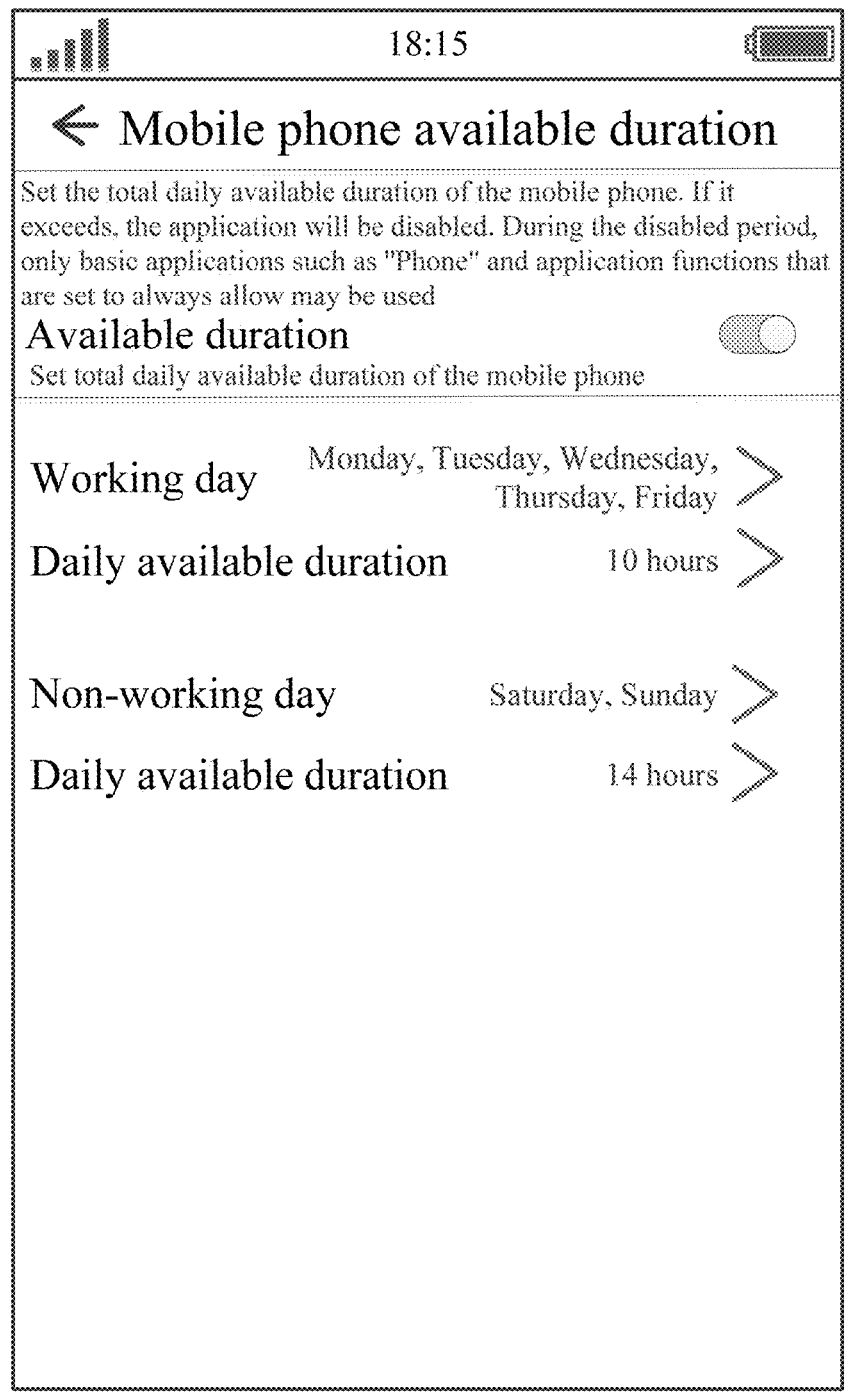
FIG. 3 is a schematic diagram of a setting interface of mobile phone available duration according to an embodiment of this application.
Figure 4:
FIG. 4 is a schematic diagram of a locking screen according to an embodiment of this application.

For example, the user may enter the setting interface of mobile phone available duration through the submenu of "Mobile Phone Available Duration" in the Screen Time setting interface, as shown in FIG. 3. In the setting interface of mobile phone available duration, the user may select to set the daily available duration on working days and non-working days, and the like. In some embodiments, after the daily available duration of the mobile phone is set, the mobile phone will be locked for use when the total using duration of the mobile phone reaches the set daily available duration, as shown in FIG. 4. A prompt message of "The use time that you set arrives, and the mobile phone has been locked" may be displayed in the locking screen, to inform the user why the mobile phone cannot be used currently. In addition, an option of "Reset Time" may be set in the locking screen, so that the user may reset the available duration.

Figure 5:
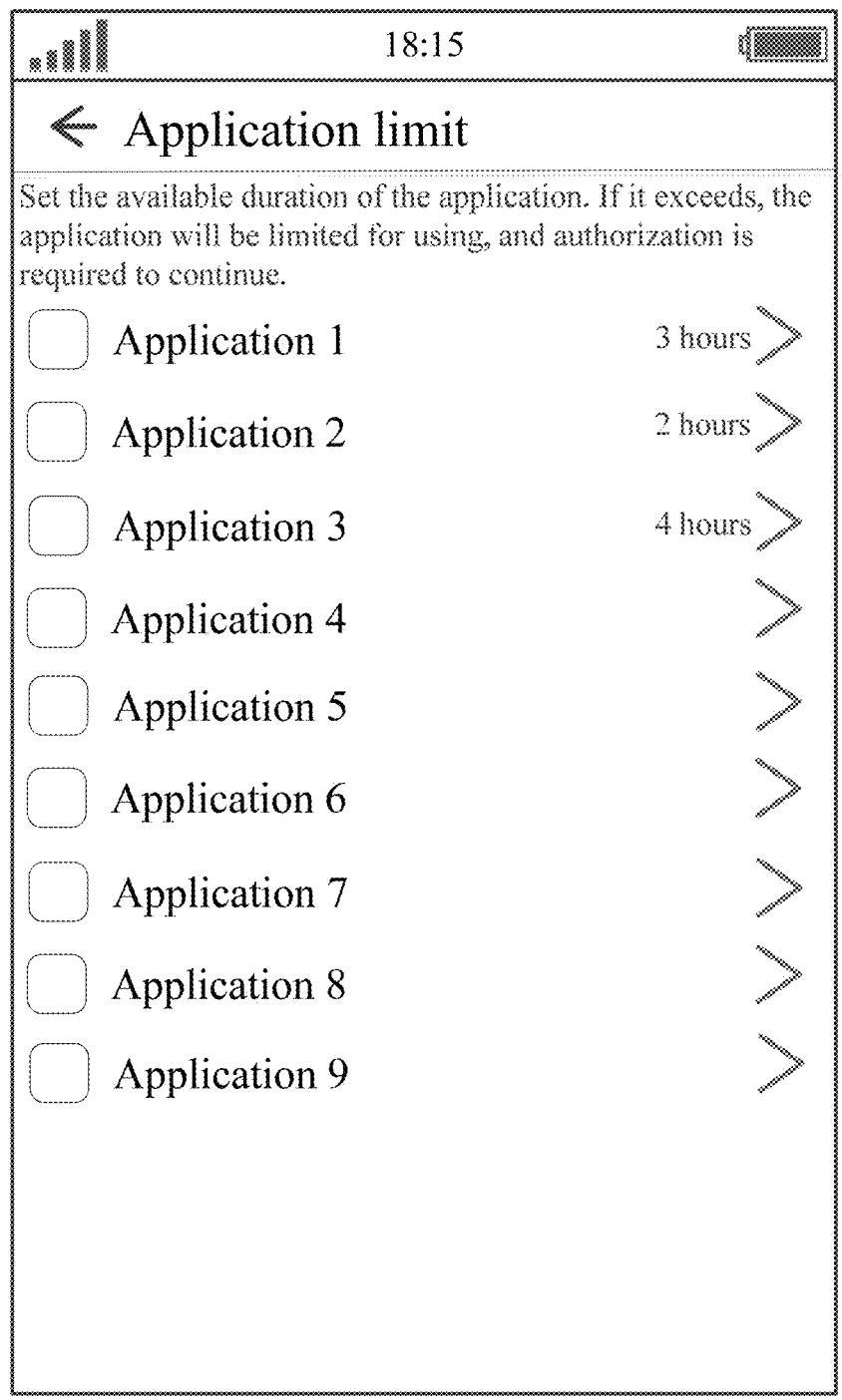
FIG. 5 is a schematic diagram of a setting interface of Application Usage Limit according to an embodiment of this application.

The user may also enter the setting interface of Application Usage Limit through the submenu of "Application Usage Limit" in the Screen Time setting interface, as shown in FIG. 5. In the setting interface of Application Usage Limit, the user may set the available duration of the application program, where the user may set same available duration or different kinds of available duration for different application programs. The user may only set the available duration for some application programs, and the use duration of remaining application programs for which no available duration is set will not be limited.

Figure 6:
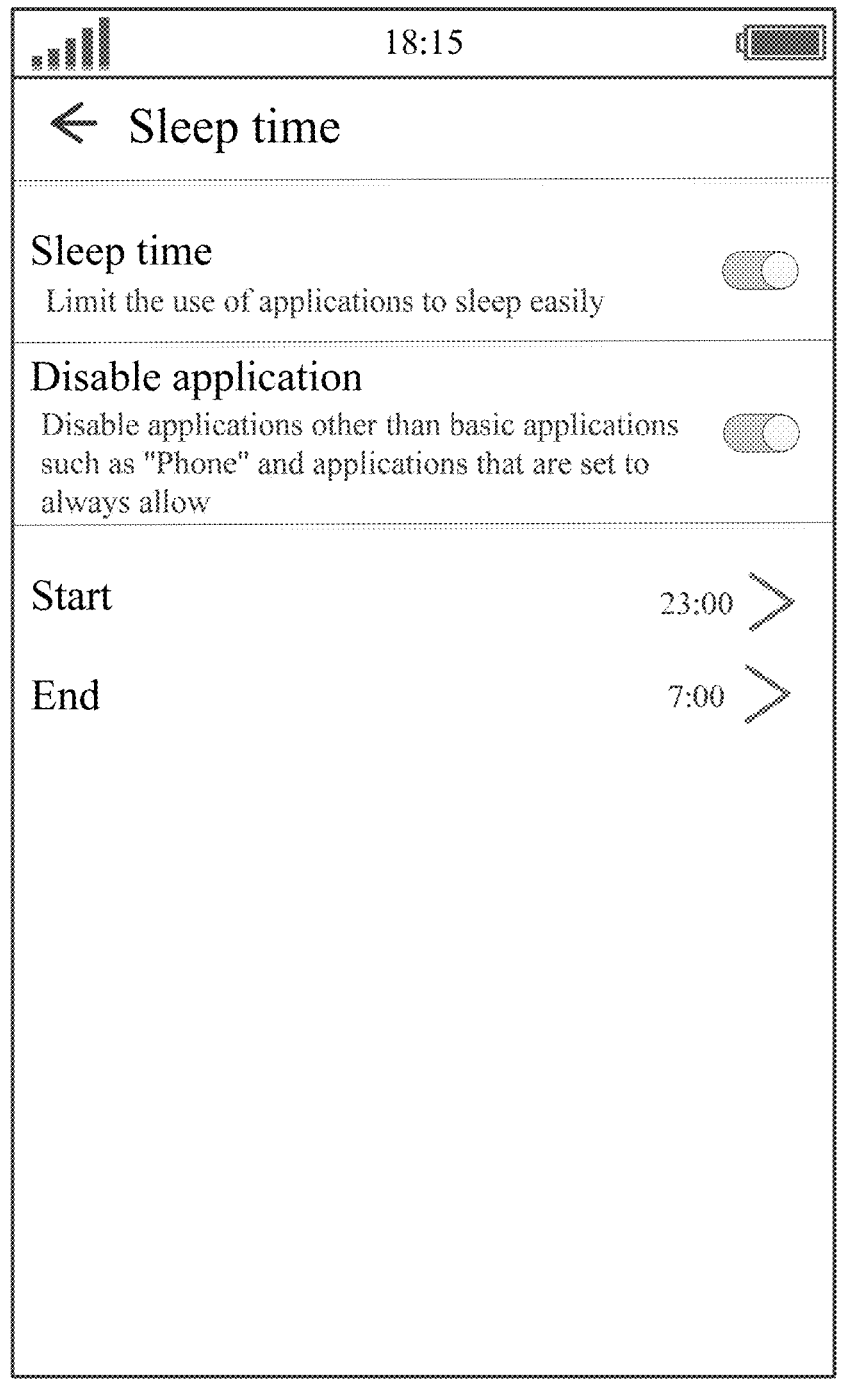
FIG. 6 is a schematic diagram of a sleep time setting interface according to an embodiment of this application.

The user may also use the "Sleep Time" submenu in the Screen Time setting interface to enter the Sleep Time setting interface, as shown in FIG. 6. In the Sleep Time setting interface, the "Sleep Time" setting switch may be used to enable or disable the Sleep Time setting. In the Sleep Time setting interface, when the Sleep Time setting is enabled, the "Disable Application" switch may be used to enable a function of disabling applications other than basic applications such as "Phone" and applications that are set to always allow. In addition, when the Sleep Time setting is enabled, a time period in the "Sleep Time" may also be set. For example, a start moment and an end moment of the "Sleep Time" may be set.

In the embodiments of this application, the first input is received, and the target user screen is displayed in response to the first input, where the target element of the target user screen is associated with the usage information of the target object. In this way, the user may learn the usage information of the target object through at least one target user screen of the displayed Lock Screen, standby screen, and prompt screen, such as learning at least one of the used duration and the remaining available duration. This avoids the cumbersome process of enabling a plurality of user screens layer by layer to check the usage information, thus simplifying the user operation.

In some embodiments, the target element varies with the usage information of the target object. In this way, the change of the target element is used to indicate the change of the usage information of the target object, which is convenient for the user to quickly learn the change of the usage of the target object, and the diversity and interest of the display effect are improved.

In some embodiments, in a case that the target user screen is the Lock Screen, the target element includes at least one of first attribute information of a Lock Screen wallpaper, a first image element of the Lock Screen wallpaper, an application icon, and an information prompt card.

The first attribute information may include at least one of parameters such as size, color, bit depth, color tone, saturation, brightness, and the like. In some embodiments, when the target element varies with the usage information of the target object, it can be at least one parameter of the first attribute information varies with the usage information of the target object. The specific parameter is not limited in this application, provided that when the parameter in the first attribute information varies with the usage information of the target object, the change of the display effect of the Lock Screen wallpaper can be learned by the user.

The first image element may be one or more patterns in the Lock Screen wallpaper, for example, the pattern may be a person, an animal, a plant, a still life, a predetermined graphic, or the like. In some embodiments, when the target element varies with the usage information of the target object, it can be at least one of parameters such as the shape, color, size, bit depth, color tone, saturation, brightness, and the like of the pattern varies with the usage information of the target object; or the pattern itself varies with the usage information of the target object. For example, when the usage information of the target object is first information, the target element is a first pattern; when the usage information of the target object is second information, the target element is a second pattern. This is not limited in the embodiments of this application, provided that when the image element varies with the usage information of the target object, the change of the display effect of the Lock Screen wallpaper can be learned by the user.

When the target object is an application program, a corresponding application icon may be used to indicate the usage information of the target object, which is convenient for the user to learn the application program corresponding to the usage information more intuitively and quickly. The application icon includes but is not limited to, an application icon and attachment icon (such as a weather attachment, a time attachment, a music attachment, and the like) associated with a startup interface of the application program. In some embodiments, when the target element varies with the usage information of the target object, it can be at least one of parameters such as the pattern, size, bit depth, color tone, saturation, brightness, and the like of the icon varies with the usage information of the target object; or the pattern itself varies with the usage information of the target object.

Figure 7:
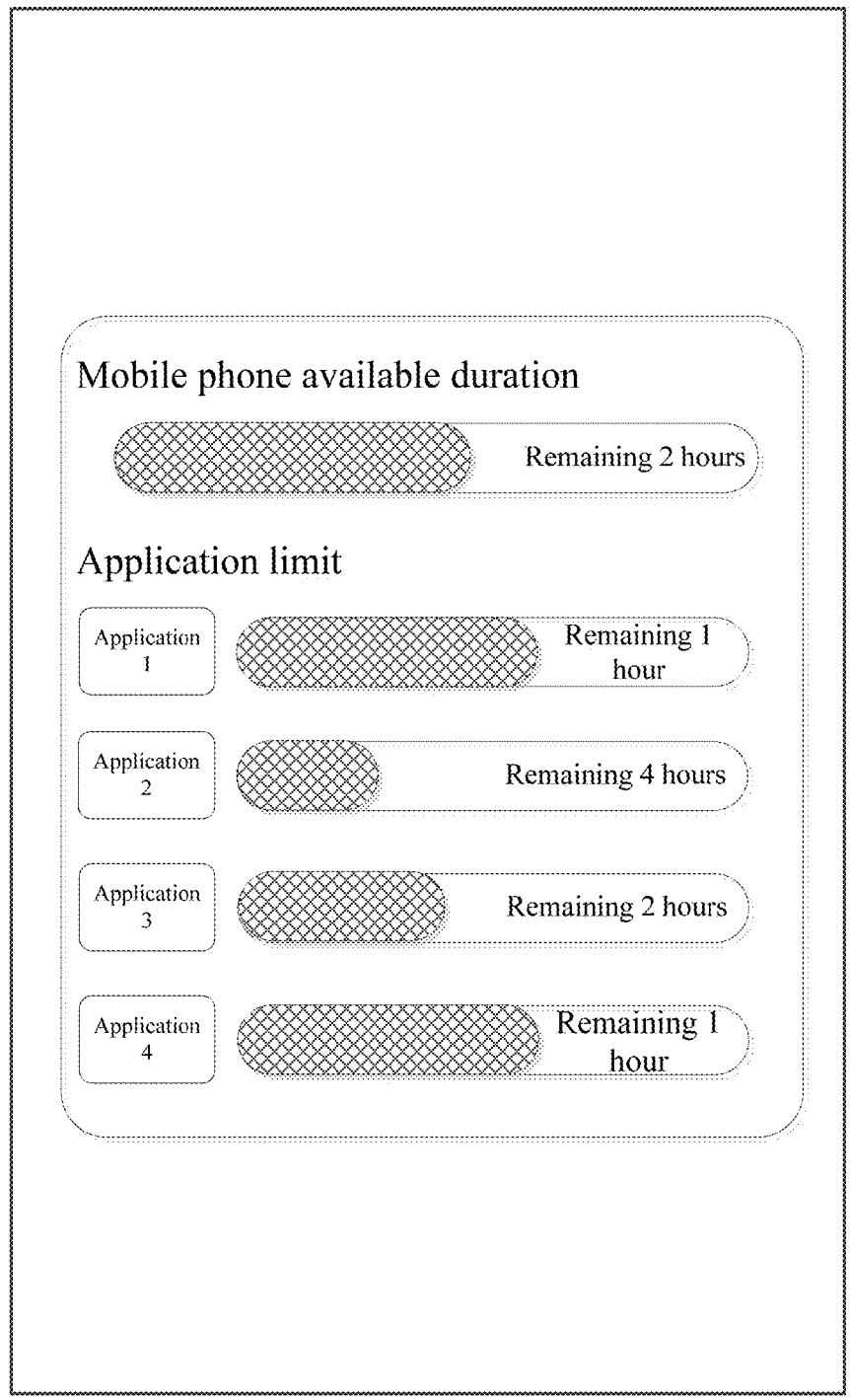
FIG. 7 is a schematic diagram of an information prompt card according to an embodiment of this application.

The information prompt card may include at least one of a first identifier corresponding to the target object and a second identifier corresponding to the usage information of the target object, as shown in FIG. 7. The first identifier and the second identifier may be a pattern, a character, or an icon. In this way, through the information prompt card, the user may more intuitively and quickly learn the target object of statistical usage information, the usage information of the target object, and the like.

In some embodiments, in a case that the target user screen is the standby screen, the target element includes at least one of second attribute information of a Home Screen wallpaper, a second image element of the Home Screen wallpaper, and an application icon.

The second attribute information may include at least one of parameters such as size, color, bit depth, color tone, saturation, brightness, and the like. In some embodiments, when the target element varies with the usage information of the target object, it can be at least one parameter of the second attribute information varies with the usage information of the target object. The specific parameter is not limited in this application, provided that when the parameter of the second attribute information varies with the usage information of the target object, the change of the display effect of the Home Screen wallpaper can be learned by the user.

The second image element may be one or more patterns in the Home Screen wallpaper, for example, the pattern may be a person, an animal, a plant, a still life, a predetermined graphic, or the like. In some embodiments, when the target element varies with the usage information of the target object, it can be at least one of parameters such as the shape, color, size, bit depth, color tone, saturation, brightness, and the like of the pattern varies with the usage information of the target object; or the pattern itself varies with the usage information of the target object. For example, when the usage information of the target object is the first information, the target element is the first pattern; when the usage information of the target object is the second information, the target element is the second pattern. This is not limited in the embodiments of this application, provided that when the image element varies with the usage information of the target object, the change of the display effect of the Home Screen wallpaper can be learned by the user.

When the target object is an application program, a corresponding application icon may be used to indicate the usage information of the target object, which is convenient for the user to learn the application program corresponding to the usage information more intuitively and quickly. The application icon includes but is not limited to, an application icon and attachment icon (such as a weather attachment, a time attachment, a music attachment, and the like) associated with a startup interface of the application program. In some embodiments, when the target element varies with the usage information of the target object, it can be at least one of parameters such as the pattern, size, bit depth, color tone, saturation, brightness, and the like of the icon varies with the usage information of the target object; or the pattern itself varies with the usage information of the target object.

In addition, when the target user screen is the standby screen, the information prompt card may also be displayed in the blank area of the standby screen, or a new screen may be created to display the information prompt card. The information prompt card may include at least one of a first identifier corresponding to the target object and a second identifier corresponding to the usage information of the target object, and reference may be made to FIG. 7. The first identifier and the second identifier may be a pattern, a character, or an icon. In this way, through the information prompt card, the user may more intuitively and quickly learn the target object of statistical usage information, the usage information of the target object, and the like.

In some embodiments, in a case that the target user screen is the prompt screen, the target element includes at least one of a first identifier corresponding to the target object and a second identifier corresponding to the usage information of the target object, and reference may be made to FIG. 7.

The first identifier and the second identifier may be a pattern, a character, or an icon. In this way, the prompt screen may directly display the target object of the statistical usage information and the usage information of the target object, so that the user may more intuitively and quickly learn the target object of the statistical usage information and the usage information of the target object.

In some embodiments, the target object is an application program; and in a case that the target user screen is the Lock Screen including the information prompt card, and the information prompt card includes at least one of the first identifier corresponding to the target object and the second identifier corresponding to the usage information of the target object, or in a case that the target user screen is the prompt screen, after the displaying a target user screen in response to the first input, the method further includes:

receiving a second input performed by a user for a target identifier, where the target identifier is the first identifier or the second identifier; and starting an application program corresponding to the target identifier in response to the second input.

Figure 8:
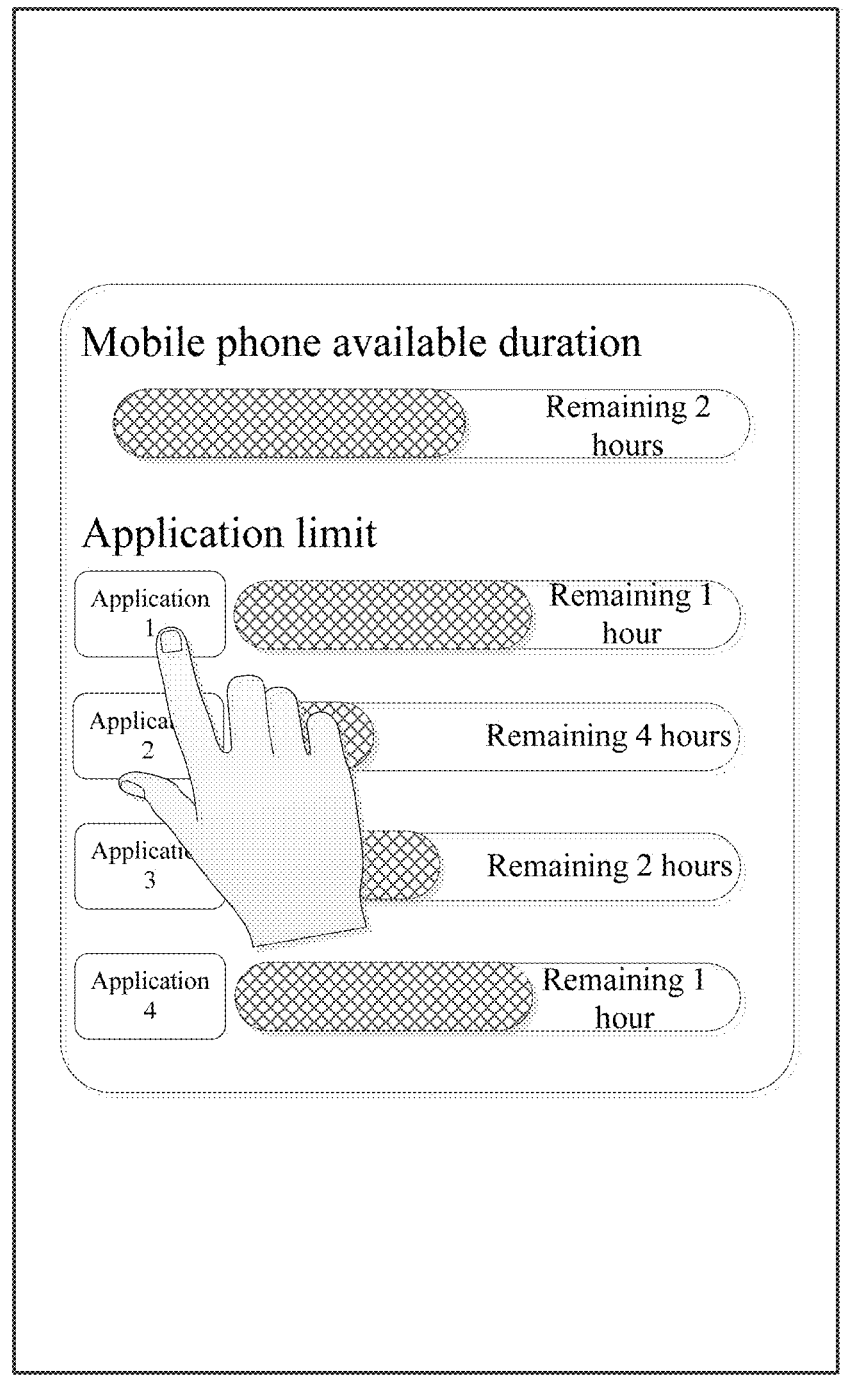
FIG. 8 is a schematic diagram of an operation performed on a target identifier of an information prompt card according to an embodiment of this application.
Figure 9:
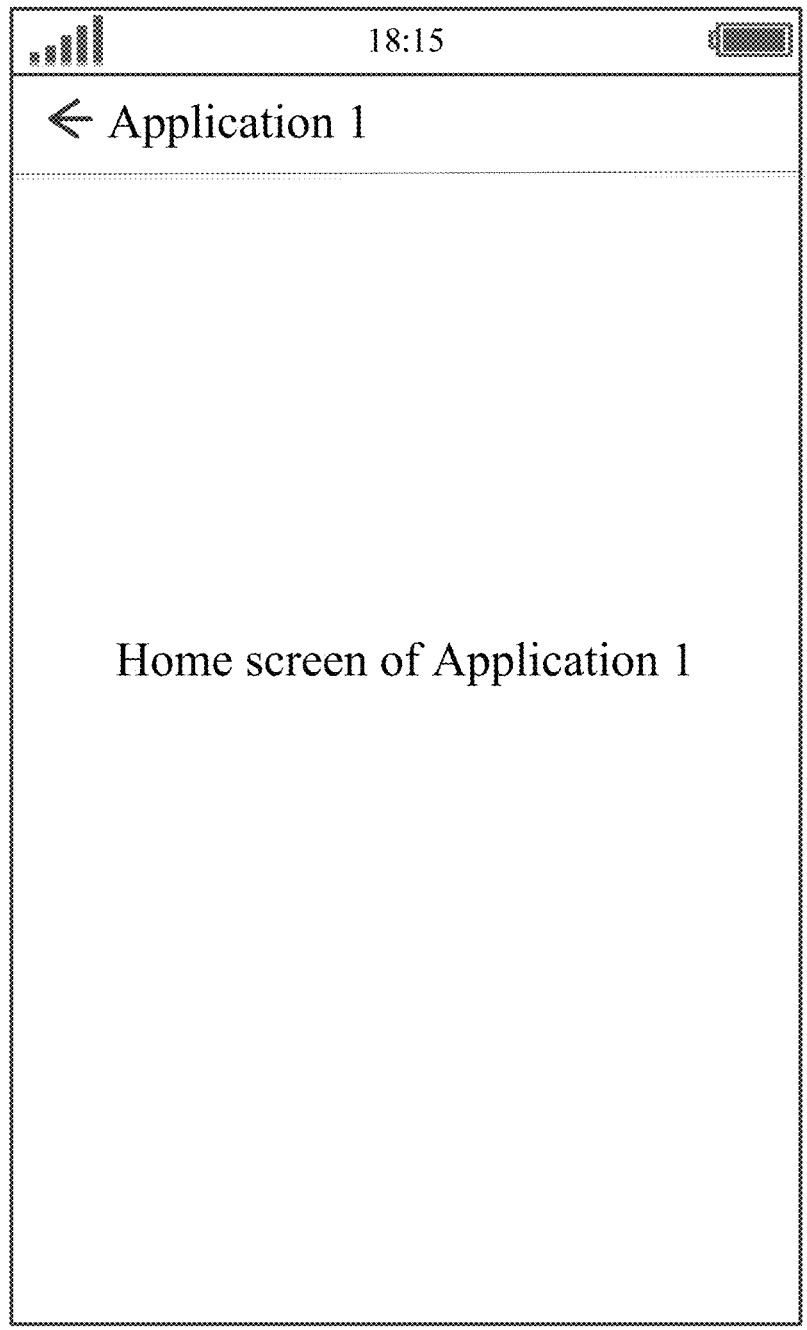
FIG. 9 is a schematic diagram of a home screen of an application program corresponding to a target identifier according to an embodiment of this application.

For example, in a case that the target user screen is the Lock Screen, the information prompt card may be displayed on the Lock Screen, as shown in FIG. 7. In a case that the information prompt card is displayed on the Lock Screen, the user may start a corresponding application program by operating the first identifier or the second identifier on the information prompt card. As shown in FIG. 8, an application screen of "Application 1" is displayed when the user selects to operate a first identifier of "Application 1", and if "Application 1" is not started before the user operates the first identifier of "Application 1", a home page of "Application 1" is displayed, as shown in FIG. 9. If "Application 1" is running in the background before the user operates the first identifier of "Application 1", a history screen of "Application 1" may be started (for example, the last displayed screen before entering the background running).

Figure 10:
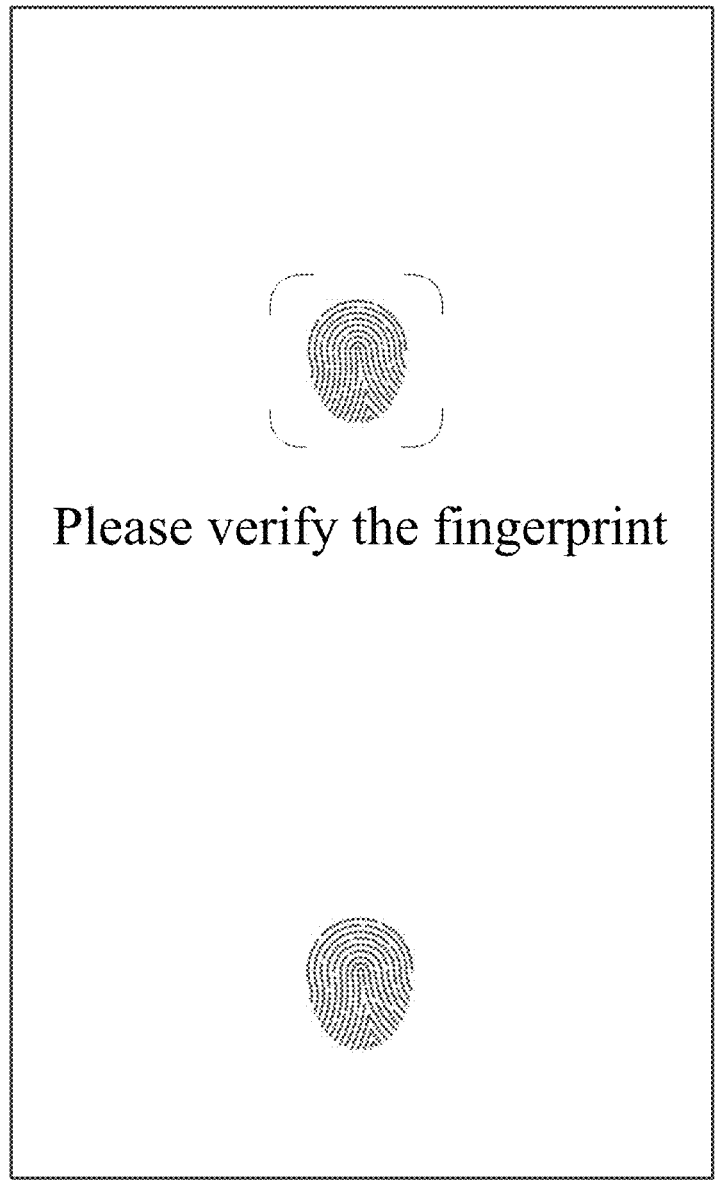
FIG. 10 is a schematic diagram of an identity authentication screen according to an embodiment of this application.

In some embodiments, when it is set in the mobile phone that identity authentication is required to start the application program in the Lock Screen, and when the user selects to operate the first identifier of "Application 1" as shown in FIG. 8, an authentication screen is displayed first, as shown in FIG. 10, to prompt the user that identity authentication is required first, and after the identity is authenticated, the application program is started. In addition to the fingerprint authentication as shown in FIG. 10, the identity authentication method may also be password authentication, face recognition authentication, and the like. This is not limited in the embodiments of this application.

In this embodiment of this application, in a case that the information prompt card in the Lock Screen is used for the user to quickly learn the usage information of the target object, the first identifier or the second identifier on the information prompt card are further used for the user to quickly start an interface of a corresponding application program, which is convenient for the user to quickly start the application program in the Lock Screen.

For another example, in a case of an application screen of an application, the user may invoke the prompt screen through the first input, and at least one of the first identifier corresponding to the target object and the second identifier corresponding to the usage information of the target object that are included in the prompt screen may be used for the user to conveniently and quickly learn the usage information of the target object in the process of using the application program. Further, the first identifier or the second identifier on the prompt screen are used for the user to quickly start the interface of the corresponding application program, which is convenient for the user to quickly start other application programs when using the application program. For example, the operation mode of starting the application program in the prompt screen is similar to that in the foregoing Lock Screen, and the display mode of the corresponding application screen is similar to that in the foregoing Lock Screen. Details are not described herein again.

In some embodiments, the displaying a target user screen includes:
    determining, based on a correspondence between the usage information and a level, a target level corresponding to the usage information of the target object;
    determining, based on a correspondence between the level and a display parameter of the target element, a target display parameter corresponding to the target level; and displaying the target element of the target user screen with the target display parameter.

Specific descriptions are provided below with reference to specific examples.

Example 1: The target element may be an image element of the wallpaper. The image element may be a flower, and the display parameter of the image element is the opening and closing degree of the flower.

It should be noted that the wallpaper and the "Wallpaper" mentioned in the following embodiments may be a Lock Screen wallpaper or a Home Screen wallpaper. The Lock Screen wallpaper may be the same as or different form the Home Screen wallpaper. When the Lock Screen wallpaper is the same as the Home Screen wallpaper, there is no need to distinguish them, that is, a same mode in the following embodiment is adopted. In a case that the Lock Screen wallpaper is different form the Home Screen wallpaper, the following embodiment is applicable for both kinds of wallpapers.

Figure 11:
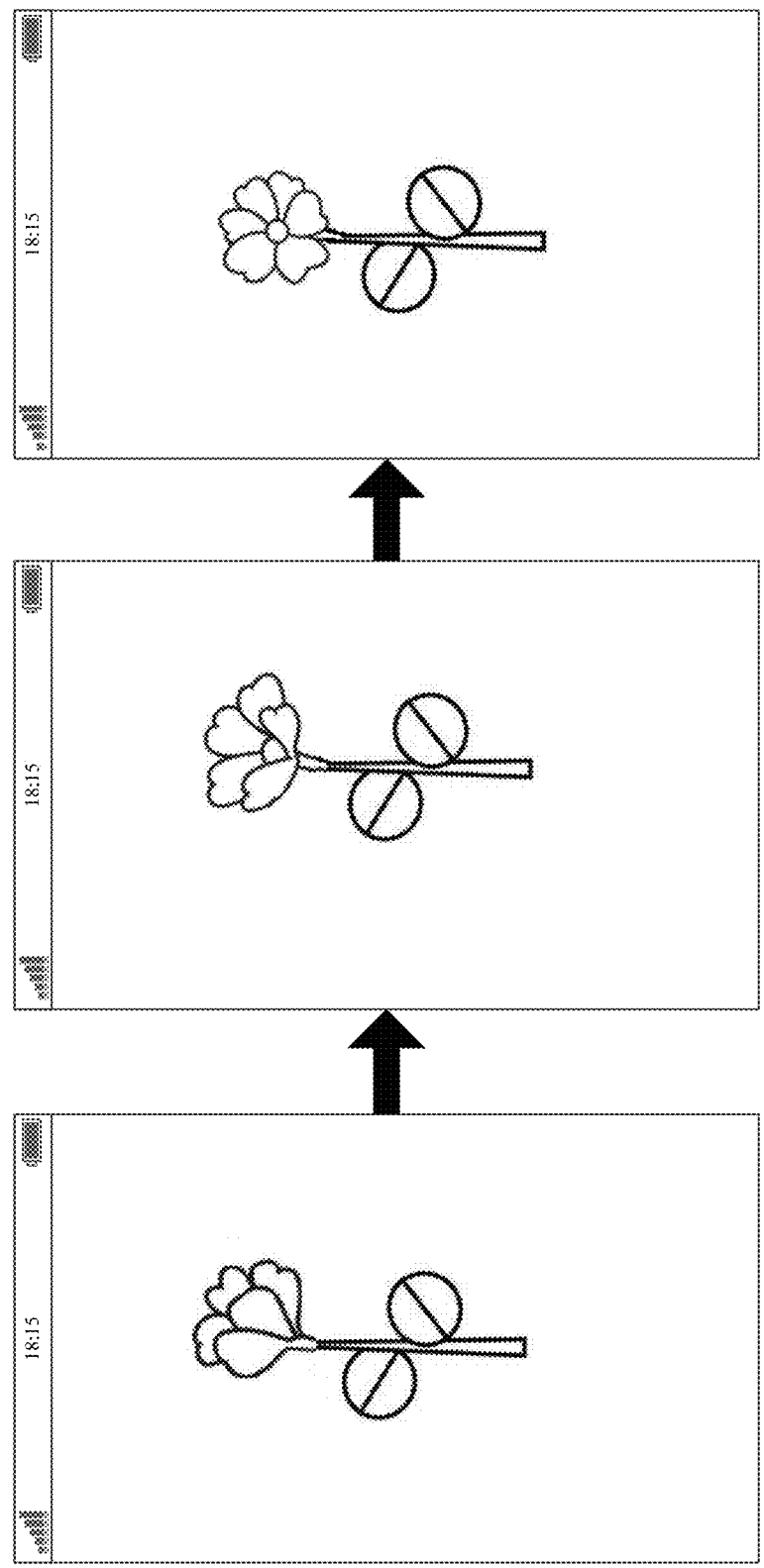
FIG. 11 is a first schematic diagram in which a target element is a wallpaper according to an embodiment of this application.

FIG. 11 is a schematic diagram of change of an opening and closing degree of a flower. As shown in FIG. 11, the opening and closing degree of the flower on the left is a first degree, which is used to indicate the first level corresponding to the first usage information of the target object, such as the first level corresponding to the used first duration or remaining available first duration of the electronic device. As shown in FIG. 11, the opening and closing degree of the flower in the middle is a second degree, which is used to indicate the second level corresponding to the second usage information of the target object, such as the second level corresponding to the used second duration or remaining available second duration of the electronic device. As shown in FIG. 11, the opening and closing degree of the flower on the right is a third degree, which is used to indicate the third level corresponding to the third usage information of the target object, such as the third level corresponding to the used third duration or remaining available third duration of the electronic device. The correspondence between the opening and closing degree of the flower and the level of the usage information is not limited to the three levels in the foregoing embodiment, and may be set based on the duration, the duration corresponding to each level, and the step length corresponding to each level, and the like. This is not limited in the embodiments of this application.

In some embodiments, as shown in the sequence from left to right in FIG. 11, the opening and closing degree of the flower increases in turn, that is, the blooming process, and states in the blooming process may be used to indicate increasing of the used duration of the target object in turn. Accordingly, as shown in the sequence from right to left in FIG. 11, the opening and closing degree of the flower decreases in turn, that is, the flower withering process, and states in the flower withering process may be used to indicate decreasing of the remaining available duration of the target object in turn. In this way, the usage information of the target object is indicated by using the opening and closing degree of the flower, that is, a natural open state of the flower. In addition to facilitating the user to quickly learn the usage information of the target object, it is also avoided that the display effect of the wallpaper is not harmonious, and helps to improve interest of the display effect of the wallpaper.

Example 2: The target element may be an image element of the wallpaper. The image element may be food, and the display parameter of the image element is a consumption degree of food.

Figure 12:
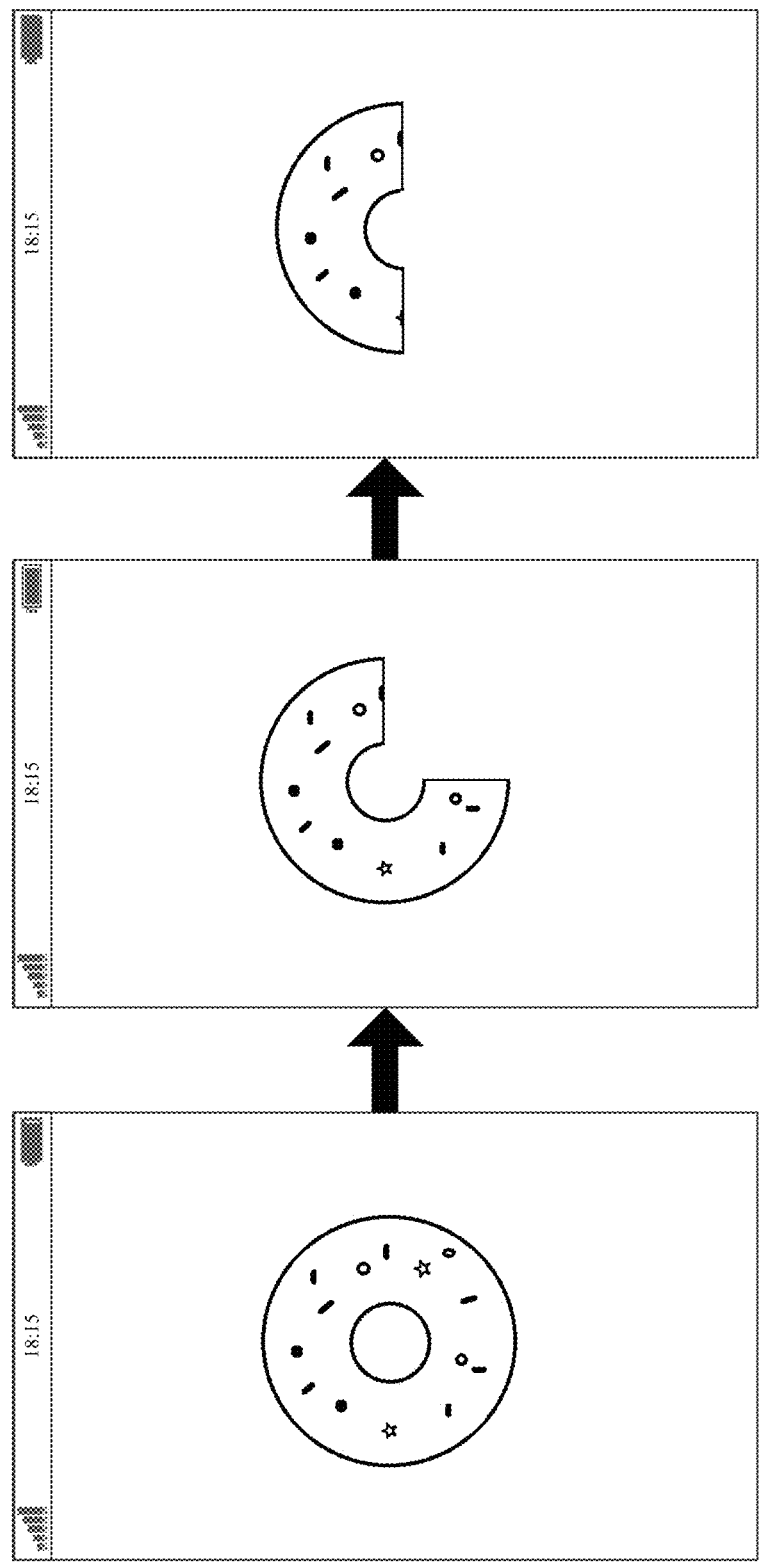
FIG. 12 is a second schematic diagram in which a target element is a wallpaper according to an embodiment of this application.

FIG. 12 is a schematic diagram of change of a consumption degree of food. As shown in FIG. 11, the consumption degree of food on the left is a first degree, which is used to indicate the first level corresponding to the first usage information of the target object, such as the first level corresponding to the used first duration or remaining available first duration of the electronic device. As shown in FIG. 11, the consumption degree of food in the middle is a second degree, which is used to indicate the second level corresponding to the second usage information of the target object, such as the second level corresponding to the used second duration or remaining available second duration of the electronic device. As shown in FIG. 11, the consumption degree of food on the right is a third degree, which is used to indicate the third level corresponding to the third usage information of the target object, such as the third level corresponding to the used third duration or remaining available third duration of the electronic device. The correspondence between the consumption degree of food and the level of the usage information is not limited to the three levels in the foregoing embodiment, and may be set based on the duration, the duration corresponding to each level, and the step length corresponding to each level, and the like. This is not limited in the embodiments of this application.

In some embodiments, as shown in the sequence from left to right in FIG. 12, the consumption degree of food decreases in turn, and the decreasing states may be used to indicate decreasing of the remaining available duration of the target object in turn. In this way, the usage information of the target object is indicated by using the consumption degree of food, that is, a natural consumption state of food. In addition to facilitating the user to quickly learn the usage information of the target object, it is also avoided that the display effect of the wallpaper is not harmonious, and helps to improve interest of the display effect of the wallpaper.

Example 3: The target element may be an image element of the wallpaper. The image element may be leaves, and the display parameter of the image element is a quantity of leaves.

Figure 13:
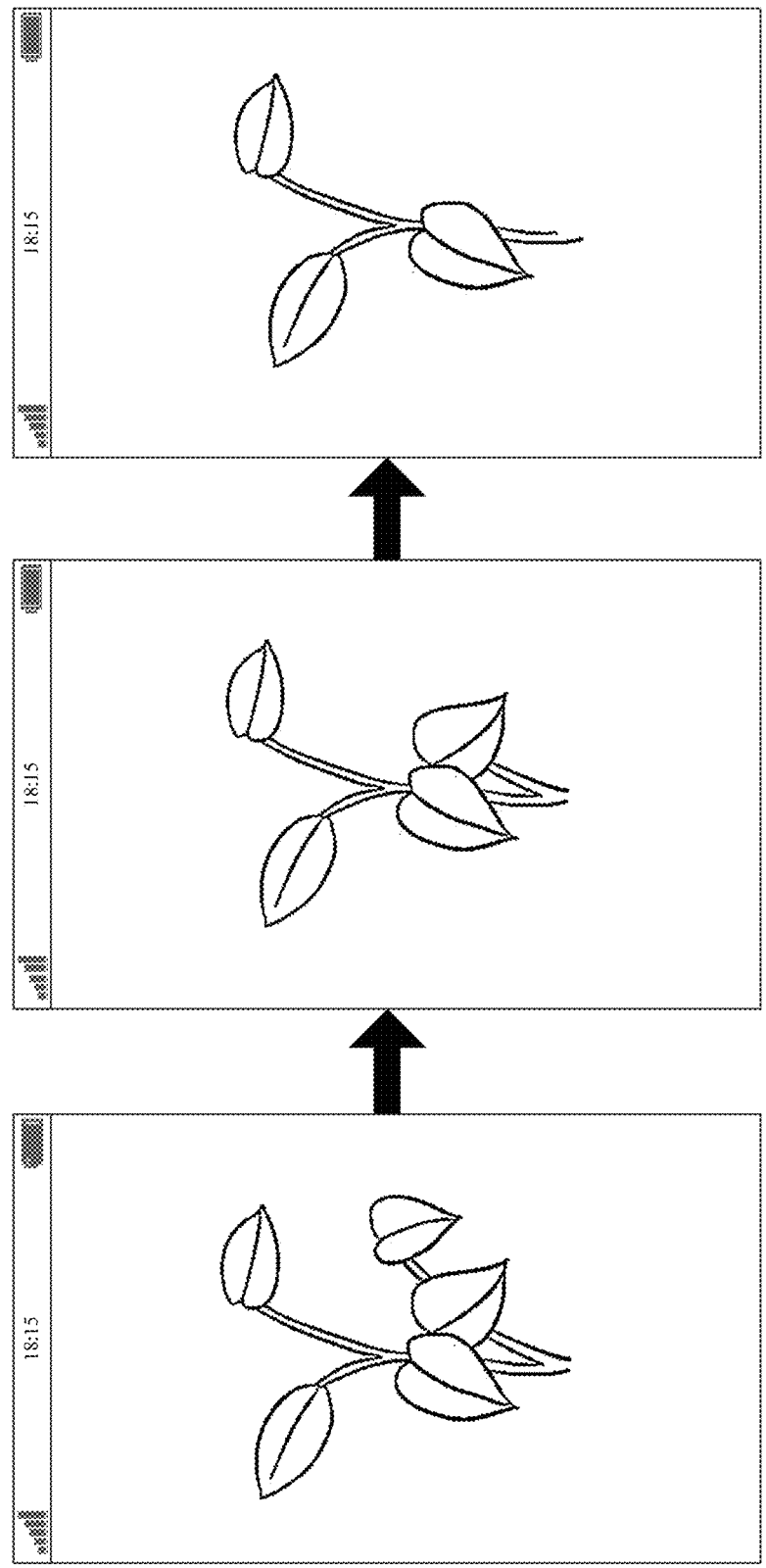
FIG. 13 is a third schematic diagram in which a target element is a wallpaper according to an embodiment of this application.

FIG. 13 is a schematic diagram of change of a quantity of leaves. As shown in FIG. 13, the quantity of leaves on the left is a first quantity, which is used to indicate the first level corresponding to the first usage information of the target object, such as the first level corresponding to the used first duration or remaining available first duration of the electronic device. As shown in FIG. 13, the quantity of leaves in the middle is a second quantity, which is used to indicate the second level corresponding to the second usage information of the target object, such as the second level corresponding to the used second duration or remaining available second duration of the electronic device. As shown in FIG. 13, the quantity of leaves on the right is a third quantity, which is used to indicate the third level corresponding to the third usage information of the target object, such as the third level corresponding to the used third duration or remaining available third duration of the electronic device. The correspondence between the quantity of leaves and the level of the usage information is not limited to the three levels in the foregoing embodiment, and may be set based on the duration, the duration corresponding to each level, and the step length corresponding to each level, and the like. This is not limited in the embodiments of this application.

In some embodiments, as shown in the sequence from left to tight in FIG. 13, the quantity of leaves decreases in turn, that is, a leaf litter process, and states in the litter process may be used to indicate decreasing of the remaining available duration of the target object in turn. As shown in the sequence from right to left in FIG. 13, the quantity of leaves increases in turn, that is, a growth process of leaves, and states in the growth process may be used to indicate increasing of the remaining available duration of the target object in turn. In this way, the usage information of the target object is indicated by the quantity of leaves, that is, the natural growth state of leaves. In addition to facilitating the user to quickly learn the usage information of the target object, it is also avoided that the display effect of the wallpaper is not harmonious, and helps to improve interest of the display effect of the wallpaper.

Example 4: The target element may be an application icon. The application icon includes the target element.

Figure 14:
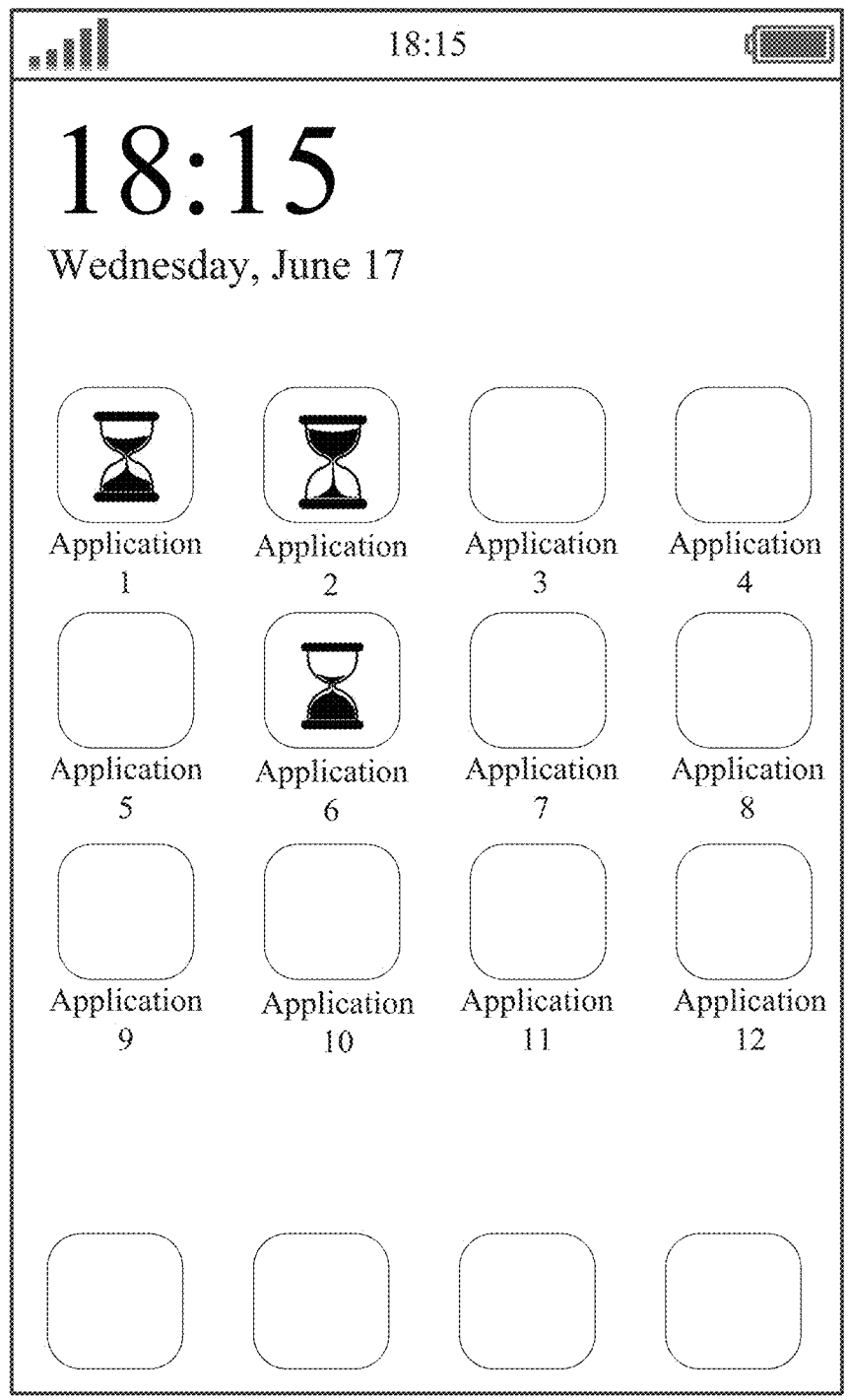
FIG. 14 is a first schematic diagram in which a target element is an application icon according to an embodiment of this application.

As shown in FIG. 14, the target element may be the "Sand Clock" element in the application icon, and the display parameter of the target element is a sand leakage degree of the sand clock. The "Sand Clock" elements on different application icons have different sand leakage degrees, which may be used to indicate different kinds of usage information of target objects corresponding to different application icons. For example, the higher the sand leakage degree is, the longer the used duration is, or the less the remaining available duration is. The sand leakage degree of the "Sand Clock" element on the same application icon may vary with the usage information of the corresponding target object. For example, the less the remaining available time of the current application is, the higher the sand leakage degree of the "Sand Clock" element on the application icon is.

In this way, the target element of the application icon is used to indicate the usage information of the application program corresponding to the target element, so that the user can quickly and conveniently learn the usage information of a specific application program, and change of the usage information of the target object is indicated by the sand leakage degree of the "Sand Clock" element representing time change. This is also convenient for the user to learn the change of the usage information of the target object more intuitively and quickly, and helps to improve interest of the display effect of the application icon.

Figure 15:
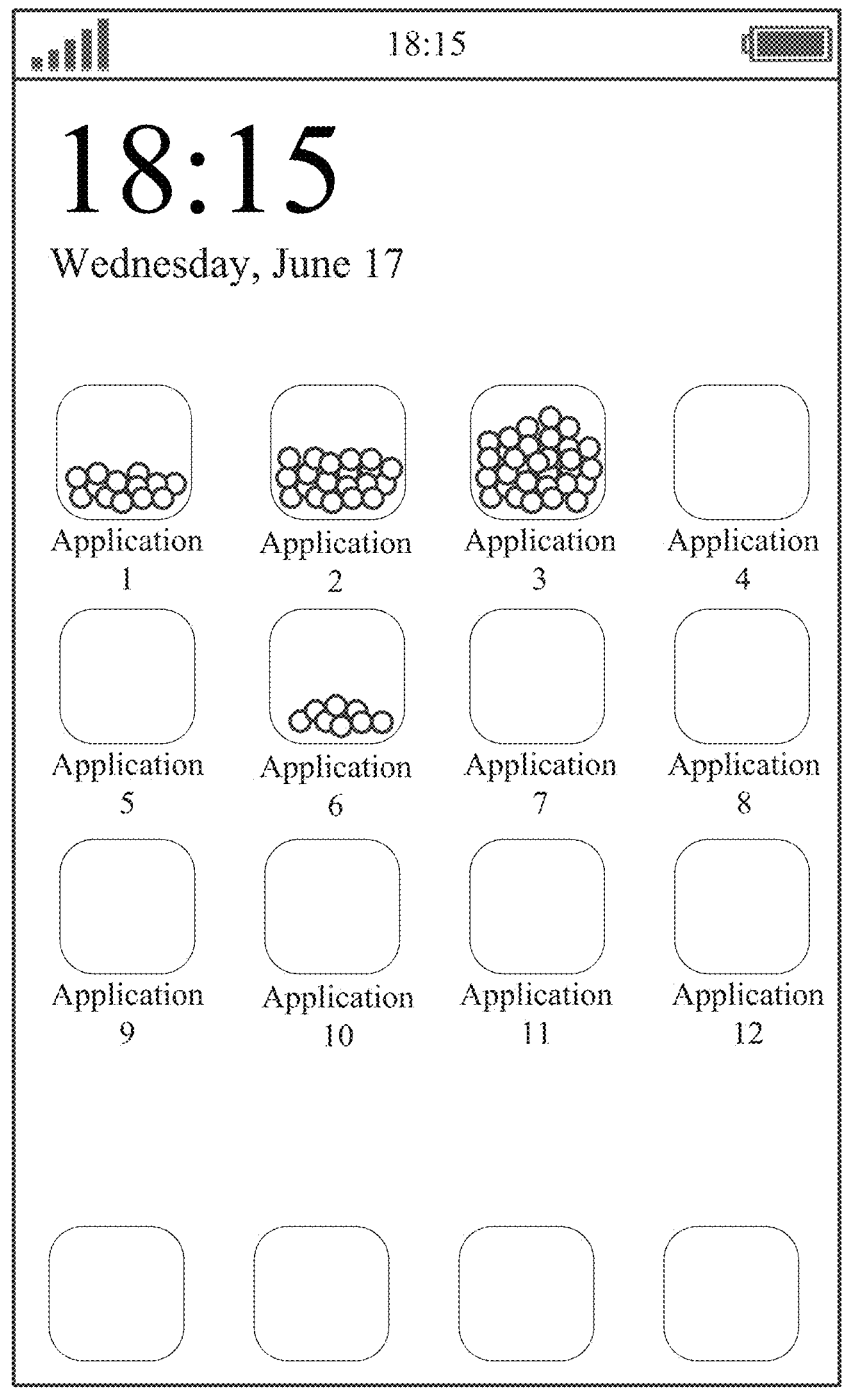
FIG. 15 is a second schematic diagram in which a target element is an application icon according to an embodiment of this application.

As shown in FIG. 15, the target element may be the "Ball" element in the application icon, and the display parameter of the target element is a quantity of balls. Different application icons have different quantities of "Ball" elements, which may be used to indicate different kinds of usage information of target objects corresponding to different application icons. For example, the more the balls are, the longer the used duration is, or the less the remaining available duration is. The quantity of "Ball" elements on the same application icon may vary with the usage information of the corresponding target object. For example, the less the remaining available time of the current application is, the more the "Ball" elements on the application icon are.

In this way, the target element of the application icon is used to indicate the usage information of the application program corresponding to the target element, so that the user can quickly and conveniently learn the usage information of a specific application program, and change of the usage information of the target object is indicated by the change of the quantity of the "Ball" elements. This is also convenient for the user to learn the change of the usage information of the target object more intuitively and quickly, and helps to improve interest of the display effect of the application icon.

In some embodiments, the target element on the application icon may be displayed on the application icon in the form of an icon mask or an icon attachment, or the target element may also be a pattern element of the application icon. This is not limited in the embodiments of this application.

In some embodiments, in addition to indicating the change of the usage information of the target object by the changes of the foregoing "Ball" element and "Sand Clock" element, the changes of the "Clock" element and the "Tetris" element may also be used to indicate the change of the usage information of the target object. This is not limited in the embodiments of this application.

Example 5: The target element may be attribute information of the wallpaper. The display parameter of the target element is a saturation value of the wallpaper.

When the wallpapers have different saturation values, displayed colors of the wallpapers are different. The change of the usage information of the target object is indicated by the change of the displayed colors of the wallpapers, which is convenient for the user to intuitively and quickly learn the change of the usage information of the target object.

In some embodiments, before the determining, based on a correspondence between the usage information and a level, a target level corresponding to the usage information of the target object, the method further includes: establishing a correspondence between the level and the display parameter of the target element.

For example, steps for establishing a correspondence between the level and the display parameter of the target element may include:

obtaining a maximum use duration corresponding to the target object; dividing the maximum use duration into N levels based on a predetermined step length, where N is a positive integer greater than 1; and establishing, for each level, a correspondence between the level and the display parameter of the target element.

In some embodiments, before the dividing the maximum use duration into N levels based on a predetermined step length, the method may further include: determining a maximum use duration and a predetermined step length that are corresponding to the target object.

For example, when the maximum use duration exceeds 1 hour, the predetermined step length may be 30 minutes; and when the maximum use duration is less than or equal to 1 hour, the predetermined step length may be 10 minutes. In this way, the predetermined step length may be flexibly adjusted based on the maximum use duration, so as to avoid excessive classification levels because the maximum use duration is long and the predetermined step length is small. As a result, the display effect of the target element that is used to indicate the usage information of the target object does not change significantly. Or the maximum use duration is short, but the predetermined step length is relatively great, so that the classification level cannot be obtained.

Specific descriptions are provided below with reference to specific examples.

Example 1: The target element is the image element of the wallpaper. For example, in a case that the opening and closing degree of the flower as shown in FIG. 11 indicates the remaining available duration of the electronic device, a correspondence between the remaining available duration of the electronic device and the opening and closing degree of the flower may be established in advance.

For example, in a case that the preset maximum use duration of the electronic device exceeds 1 hour, the maximum use duration is divided into N levels with half an hour (namely, 30 minutes) as the step length. For example, the opening and closing degree of the flower=minutes of the remaining available duration of the electronic device on that day/30.

For example, if the maximum use duration is 1.5 hours, the remaining available duration may be set to 1-1.5 hours as the first level, corresponding to the first opening and closing degree; the remaining available duration may be set to 0.5-1 hour as the second level, corresponding to the second opening and closing degree; the remaining available duration may be set to 0-0.5 hours as the third level, corresponding to the third opening and closing degree, that is, the correspondence between the remaining available duration of the electronic device and the opening and closing degree of the flower is established.

In this way, the opening and closing degree of the flower displayed in the wallpaper may be updated based on the pre-established correspondence between the remaining available duration of the electronic device and the opening and closing degree of the flower. The opening and closing degree is increased by one degree every 30 minutes, and reference may be made to the sequence from left to right in FIG. 11.

For example, in a case that the preset maximum use duration of the electronic device is equal to or less than 1 hour, the maximum use duration is divided into N levels with 10 minutes as the step length. For example, the opening and closing degree of the flower=minutes of the remaining available duration of the electronic device on that day/10.

For example, if the maximum use duration is 30 minutes, the remaining available duration may be set to 20-30 minutes as the first level, corresponding to the first opening and closing degree; the remaining available duration may be set to 10-20 minutes as the second level, corresponding to the second opening and closing degree; the remaining available duration may be set to 0-10 minutes as the third level, corresponding to the third opening and closing degree, that is, the correspondence between the remaining available duration of the electronic device and the opening and closing degree of the flower is established.

In this way, the opening and closing degree of the flower displayed in the wallpaper may be updated based on the pre-established correspondence between the remaining available duration of the electronic device and the opening and closing degree of the flower. The opening and closing degree is increased by one degree every 10 minutes, and reference may be made to the sequence from left to right in FIG. 11.

In some embodiments, the usage information of the target object may also be indicated by the quantity of petals dropped, for example, a correspondence between the level and the quantity of petals dropped is established. For example, dropping a petal indicates that the remaining time is shortened by one step, and as shown in the foregoing embodiment, the step length is 10 minutes, that is, dropping a petal every 10 minutes. For the dropping process of petals, please refer to the dropping process of leaves in FIG. 13. In some embodiments, the dropped petals or leaves may be displayed below the flower or branch, so that the user can learn the used duration based on the quantity of dropped petals or leaves.

Example 2: The target element is the attribute information of the wallpaper, and a correspondence between the remaining available duration of the electronic device and the saturation of the wallpaper may be established in advance.

For example, when the correspondence between the remaining available duration of the electronic device and the saturation of the wallpaper is established, the method for determining the step length is similar to that in the foregoing embodiment. Details are not described herein again. Taking the step length of 10 minutes as an example, the correspondence between the remaining available duration of the electronic device and the saturation of the wallpaper is described below.

For example, the saturation of the wallpaper or referred to as the screen grayscale coefficient minutes of the remaining available duration of the electronic device on that day/10. For example, if the remaining available duration of the electronic device on that day is 1 hour, the screen grayscale coefficient is 60/10=6, and the screen grayscale is divided into 6 ranges. One range is corresponding to one level. For example, the remaining available duration is set to 0-10 minutes as the first level, corresponding to the first range; the remaining available duration is set to 10-20 minutes as the second level, corresponding to the second range, and the remaining available duration is set to 20-30 minutes as the third level, corresponding to the third range, and so on. In this way, the displayed saturation of the wallpaper may be updated based on the pre-established correspondence between the remaining available duration of the electronic device and the screen grayscale coefficient, that is, the grayscale will be reduced by one range every 10 minutes.

Example 3: The target element is the image element of the wallpaper. For example, in a case that the consumption degree of food as shown in FIG. 12 indicates the remaining available duration of the electronic device, a correspondence between the remaining available duration of the electronic device and the consumption degree of food may be established in advance.

For example, when the correspondence between the remaining available duration of the electronic device and the consumption degree of food is established, the method for determining the step length is similar to that in the foregoing embodiment. Details are not described herein again. Setting the step length to 60 minutes is taken as an example, the correspondence between the remaining available duration of the electronic device and the consumption degree of food is described below.

For example, the consumption degree of food or referred to as the remaining quantity of food (single quantity or average quantity)=minutes of the remaining available duration of the electronic device on that day/60. For example, if the maximum use duration of the electronic device on that day is 12 hours, a total quantity or average quantity of corresponding food is 7200/60=12. That is, the food in the screen is divided into 12 portions, and one portion is consumed every 60 minutes.

Example 4: The target element is an application icon. The correspondence between the remaining available duration of the application program corresponding to the application icon and the display parameter of the target element may be established in advance. For example, the display parameter is the sand leakage degree of the sand clock.

For example, when the correspondence between the remaining available duration of the application program and the sand leakage degree of the sand clock is established, the method for determining the step length is similar to that in the foregoing embodiment. Details are not described herein again.

For example, the application icon of the application program whose use duration is limited may be masked to display the sand clock, as shown in FIG. 14. As time goes by, that is, the remaining available time decreases, the dynamic dropping effect of sand in the sand clock is displayed.

In some embodiments, in a case that the maximum use duration corresponding to the application program exceeds 1 hour, the order of magnitude of the sand at the bottom of the sand clock is updated with half an hour as the step length. If the total quantity of divided parts of sand in the sand clock=the maximum use duration corresponding to the application program on that day/30, the sand of each order of magnitude is determined based on the total quantity of divided parts, that is, an order of magnitude of sand is added to the bottom of the sand clock every 30 minutes.

In some embodiments, in a case that the maximum use duration corresponding to the application program is equal to or less than 1 hour, the order of magnitude of the sand at the bottom of the sand clock is updated with 10 minutes as the step length. If the total quantity of divided parts of sand in the sand clock=the maximum use duration corresponding to the application program on that day/10, the sand of each order of magnitude is determined based on the total quantity of divided parts, that is, an order of magnitude of sand is added to the bottom of the sand clock every 10 minutes.

In addition, the application icon of the application program whose use duration is limited may also be masked to display the Tetris. As time goes by, the blocky dropping effect of the Tetris is displayed. Tetris dropping and piling up indicates the time consumed, which is similar to the consumed time represented by sand piled up at the bottom of the sand clock, so details are not described herein again.

In some embodiments, the correspondence between the attribute information of the application icon and the usage information may be established, such as the correspondence between the display grayscale range of the application icon and the level of the usage information, and one display grayscale range of the application icon is corresponding to one level of usage information. When the use duration is consumed for one step length, the grayscale of the application icon is reduced by one range.

In addition, when the use duration is consumed for one step length, the application icon is transparent and dimmed for a unit of area, or the application icon is transparent and dimmed for a unit length of region, or the application icon is transparent and dimmed for a unit quantity of element. When the application icon or the element in the application icon is transparent and dimmed, the application icon is switched to the locked state, that is, when the user clicks the icon in the locked state, it does not respond (for example, a corresponding application program may not be started). In some embodiments, when the application icon is in the locked state for the preset duration, the locked state may be released.

In some embodiments, when the target element is an element other than elements in the foregoing example, the method for establishing the correspondence between the display parameter of the target element and the usage information of the target object may be implemented in a manner similar to that in the foregoing embodiment. This is not limited in the embodiments of this application.

In some embodiments, a quantity of the target objects may be greater than 1; in a case that the target element includes the first image element of the Lock Screen wallpaper, a quantity of the first image elements is greater than 1, and one first image element is corresponding to one target object; and in a case that the target element includes the second image element of the Home Screen wallpaper, a quantity of the second image elements is greater than 1, and one second image element is corresponding to one target object.

Figure 16:
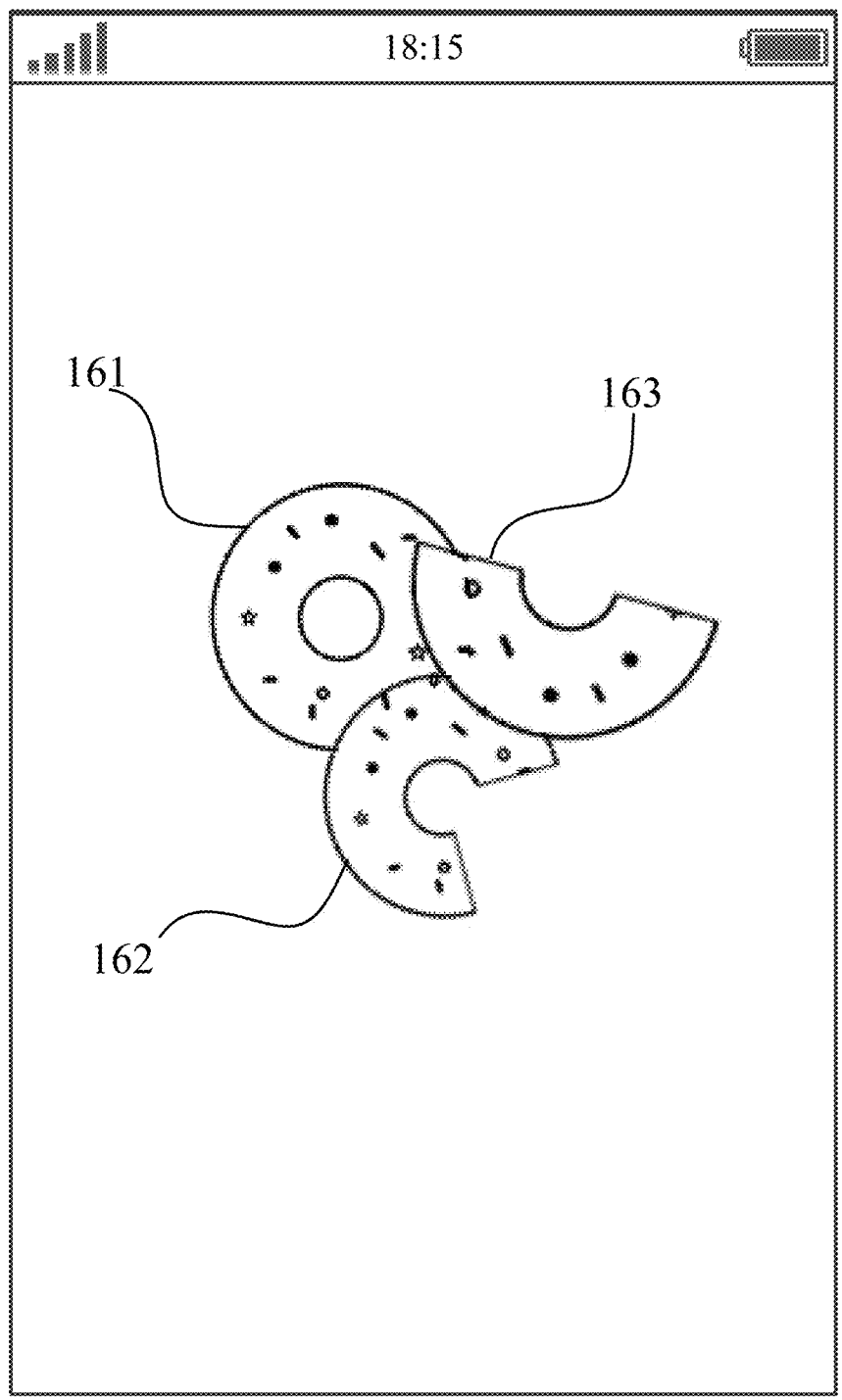
FIG. 16 is a fourth schematic diagram in which a target element is a wallpaper according to an embodiment of this application.

For example, if the quantity of target objects is three, the quantity of target elements in the wallpaper may be correspondingly set to three. As shown in FIG. 16, the first target element 161 is associated with the usage information of the first target object, the second target element 162 is associated with the usage information of the second target object, and the third target element 163 is associated with the usage information of the third target object.

In this way, when the target object is an application program, after setting a limit for the use duration of the application program, usage information of different application programs may be indicated through the Lock Screen wallpaper in the Lock Screen or the Home Screen wallpaper in the standby screen, which is convenient for the user to intuitively, quickly, and conveniently learn the usage information of the application program through the Lock Screen wallpaper when the application icon may not be visible for the user in the Lock Screen.

In some embodiments, different parts of the image element in the wallpaper may be set to be corresponding to different target objects. If the image element is a flower, different petals may be corresponding to different target objects, and the change of the size of the petal may be used to indicate the change of the usage information of the target object; or when the image element includes a plurality of flowers, different flower stems may be corresponding to different target objects, and the change of the length of the flower stem may be used to indicate the change of the usage information of the target object; or when the image element includes a plurality of flowers, different flowers may be corresponding to different target objects, and the opening and closing degree of the flower may be used to indicate the change of the usage information of the target object. This is not limited in the embodiments of this application.

In some embodiments, in a case that the target element in the wallpaper is used to indicate the usage information of the target object, when the used duration of the target object reaches the limited maximum duration, the target object is limited for using. After limiting the use of the target object, the limitation on the use of the target object may be unlocked after a predetermined period of time, in this case, the third input for the target element on the wallpaper from the user may be received, and the use duration setting screen of the target object corresponding to the target element may be displayed in response to the third input, so that the user can quickly set the use duration of the target object.

It should be noted that, the display method provided in this embodiment of this application may be performed by a display apparatus or a control module that is in the display apparatus and that is configured to perform the display method. In this embodiment of this application, the display apparatus provided in the embodiments of this application is described by using an example in which the display method is performed by the display apparatus.

Figure 17:
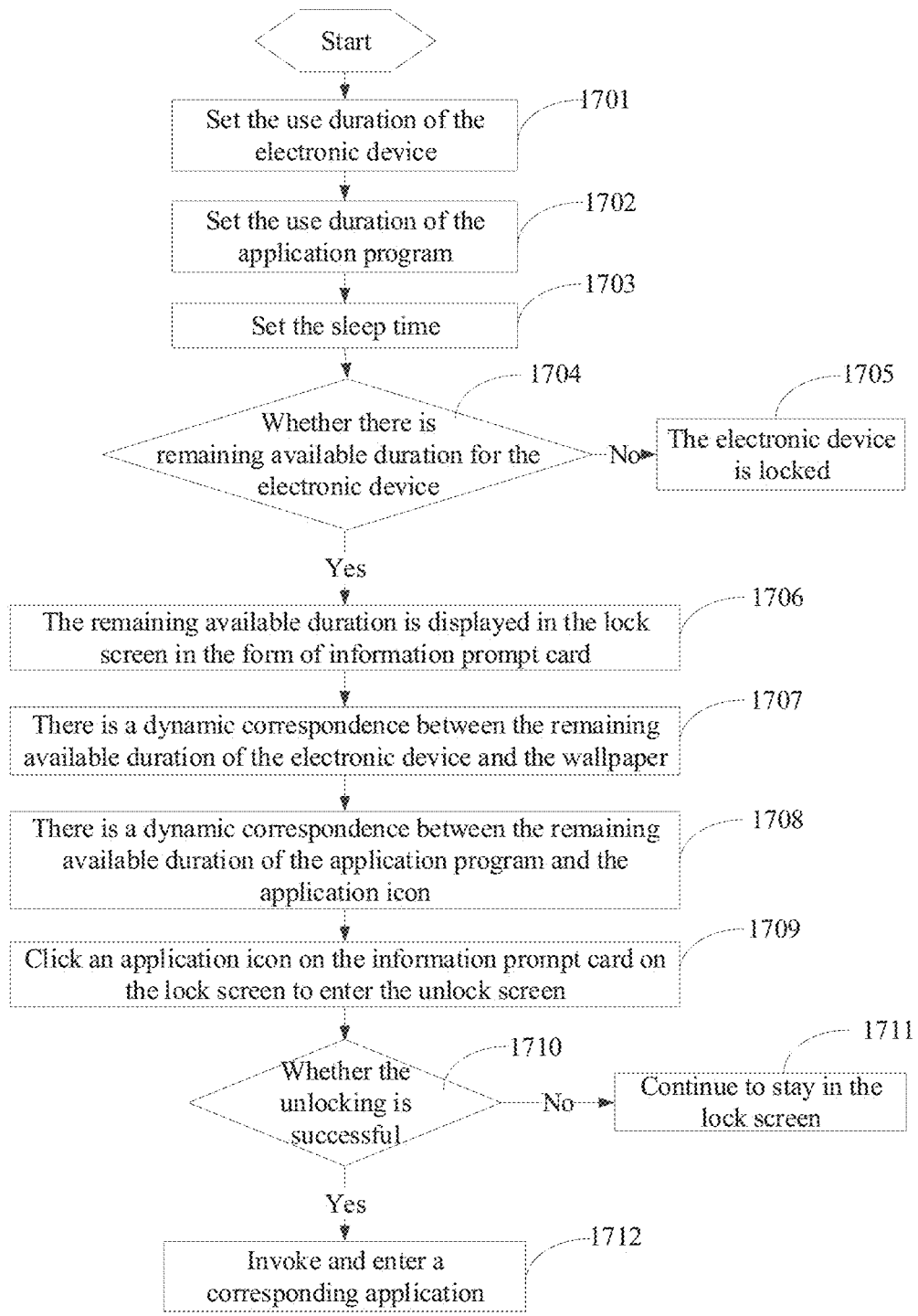
FIG. 17 is a second flowchart of a display method according to an embodiment of this application.

As shown in FIG. 17, taking a mobile phone as an example, an embodiment of this application provides a specific description of a display method, and the method may include the following steps.

Step 1701: Set the use duration of the electronic device.

Step 1702: Set the use duration of the application program.

Step 1703: Set the sleep time.

In some embodiments, an execution sequence among step 1701 to step 1703 is not limited, that is, the user may set the use duration in step 1701 to step 1703 in any order or at the same time. For example, the foregoing parameters are set through the setup menu of "Electronic Device Use Duration", "Application Program Use Duration", and "Sleep Time" in the setup screen. Reference may be made to FIG. 2, FIG. 3, FIG. 5, and FIG. 6, and details are not described herein again.

Step 1704: Determine whether there is remaining available duration for the electronic device.

Step 1705: if there is no remaining available duration for the electronic device, the electronic device is locked, and reference may be made to FIG. 4.

Step 1706: there is remaining available duration for the electronic device, the remaining available duration is displayed in the Lock Screen in the form of information prompt card, and reference may be made to FIG. 7.

Step 1707: There is a dynamic correspondence between the remaining available duration of the electronic device and the wallpaper, and reference may be made to FIG. 11 to FIG. 13. For a specific implementation, refer to the foregoing embodiments. Details are not described herein again.

Step 1708: There is a dynamic correspondence between the remaining available duration of the application program and the application icon, and reference may be made to FIG. 14 and FIG. 15. For a specific implementation, refer to the foregoing embodiments. Details are not described herein again.

Step 1709: Click an application icon on the information prompt card on the Lock Screen to unlock the screen, and reference may be made to FIG. 8 and FIG. 10.

Step 1710: Determine whether the unlocking is successful.

Step 1711: If the unlocking fails, continue to stay in the Lock Screen.

Step 1712: If the unlocking is successful, invoke and enter a corresponding application program.

In this way, because the application program with limited use duration that is set by the user is usually a commonly used application program, by operating the information prompt card in the Lock Screen, when the unlocking is successful, the corresponding application program may be directly started, for example, displaying a home page of the application program, as shown in FIG. 9, or displaying the history screen running in the background. This may be convenient for the user to start the application program quickly, help to simplify the operation process of the user and improve the start efficiency of the application program.

Figure 18:
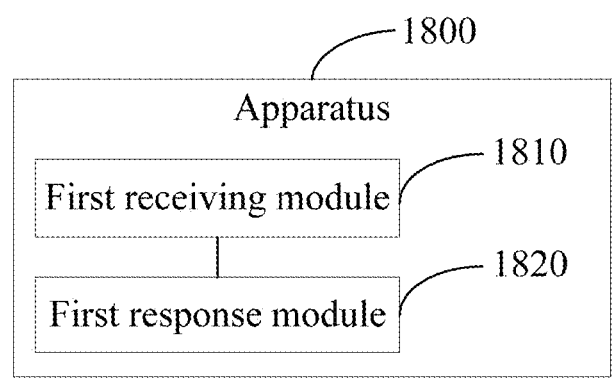
FIG. 18 is a block diagram of a display apparatus according to an embodiment of this application.

As shown in FIG. 18, an embodiment of this application further provides a display apparatus 1800, including:
  a first receiving module 1810, configured to receive a first input; and
  a first response module 1820, configured to display a target user screen in response to the first input, where a target element of the target user screen is associated with usage information of a target object, where
  the target user screen includes at least one of a Lock Screen, a standby screen, and a prompt screen; and the usage information includes at least one of used duration and remaining available duration.

In some embodiments, in a case that the target user screen is the Lock Screen, the target element includes at least one of first attribute information of a Lock Screen wallpaper, a first image element of the Lock Screen wallpaper, an application icon, and an information prompt card;
  in a case that the target user screen is the standby screen, the target element includes at least one of second attribute information of a Home Screen wallpaper, a second image element of the Home Screen wallpaper, and an application icon; and
  in a case that the target user screen is the prompt screen, the target element includes at least one of a first identifier corresponding to the target object and a second identifier corresponding to the usage information of the target object.

In some embodiments, the target object is an application program; and
  in a case that the target user screen is the Lock Screen including the information prompt card, and the information prompt card includes at least one of the first identifier corresponding to the target object and the second identifier corresponding to the usage information of the target object, or in a case that the target user screen is the prompt screen, the apparatus 1800 further includes:
  a second receiving module, configured to receive a second input performed by a user for a target identifier, where the target identifier is the first identifier or the second identifier; and
  a second response module, configured to start an application program corresponding to the target identifier in response to the second input.

In some embodiments, a quantity of the target objects is greater than 1;
  in a case that the target element includes the first image element of the Lock Screen wallpaper, a quantity of the first image elements is greater than 1, and one first image element is corresponding to one target object; and
  in a case that the target element includes the second image element of the Home Screen wallpaper, a quantity of the second image elements is greater than 1, and one second image element is corresponding to one target object.

In some embodiments, the target element varies with the usage information of the target object.

In some embodiments, the first response module 1820 includes:
  a first determining unit, configured to determine, based on a correspondence between the usage information and a level, a target level corresponding to the usage information of the target object; and
  a second determining unit, configured to: determine, based on a correspondence between the level and a display parameter of the target element, a target display parameter corresponding to the target level; and
  display the target element of the target user screen with the target display parameter.

In some embodiments, the first response module 1820 further includes:
  an obtaining unit, configured to obtain a maximum use duration corresponding to the target object;
  a first processing unit, configured to divide the maximum use duration into N levels based on a predetermined step length, where N is a positive integer greater than 1; and
  a second processing unit, configured to establish, for each level, a correspondence between the level and the display parameter of the target element.

The display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like. The non-mobile electronic device may be a server, a Network Attached Storage (NAS), a Personal Computer (PC), a Television (TV), a teller machine, a self-service machine, or the like. This is not specifically limited in the embodiments of this application.

The display apparatus in this embodiment of this application may be an apparatus with an operating system. The operating system may be an Android operating system, may be an iOS operating system, or may be another possible operating system, which is not specifically limited in the embodiments of this application.

The display apparatus provided in this embodiment of this application can implement processes implemented in the method embodiments from FIG. 1 to FIG. 17. To avoid repetition, details are not described herein again.

The display apparatus 1800 in this embodiment of this application displays the target user screen by receiving the first input and being in response to the first input, where the target element of the target user screen is associated with the usage information of the target object. In this way, the user may learn the usage information of the target object through at least one target user screen of the displayed Lock Screen, standby screen, and prompt screen, such as learning at least one of the used duration and the remaining available duration. This avoids the cumbersome process of enabling a plurality of user screens layer by layer to check the usage information, thus simplifying the user operation.

Figure 19:
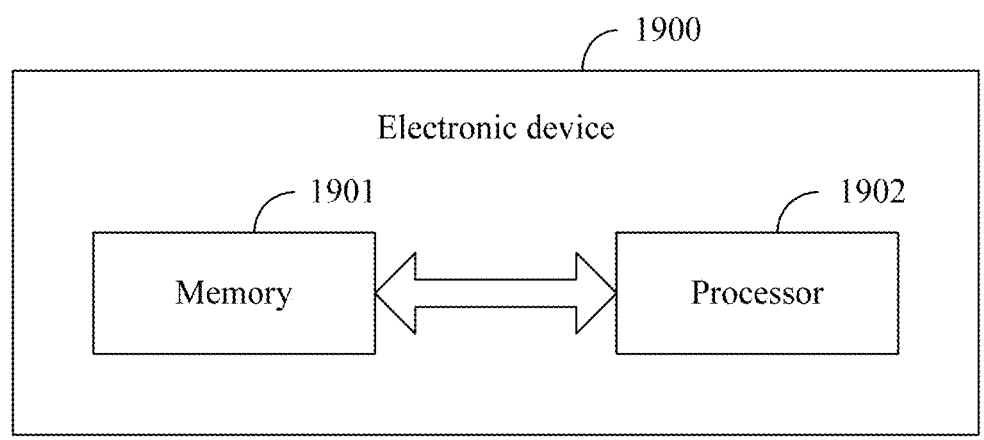
FIG. 19 is a block diagram of an electronic device according to an embodiment of this application.

In some embodiments, as shown in FIG. 19, an embodiment of this application further provides an electronic device 1900, including a processor 1901, a memory 1902, and a program or an instruction stored in the memory 1902 and executable on the processor 1901. When the program or the instruction is executed by the processor 1901, the processes of the foregoing display method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 20:
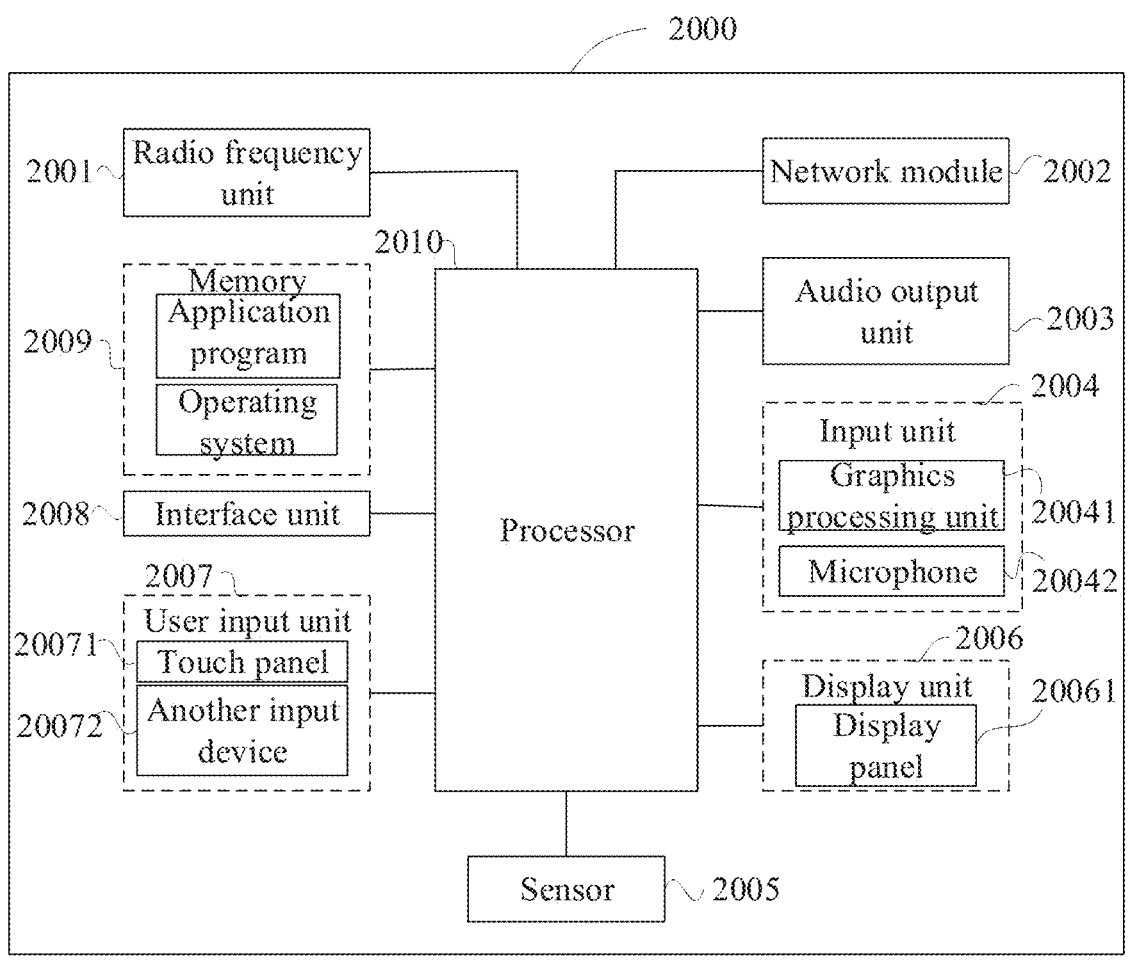
FIG. 20 is a schematic diagram of a hardware structure of an electronic device according to an embodiment of this application.

FIG. 20 is a schematic diagram of a hardware structure of an electronic device according to an embodiment of this application.

The electronic device 2000 includes but is not limited to components such as a radio frequency unit 2001, a network module 2002, an audio output unit 2003, an input unit 2004, a sensor 2005, a display unit 2006, a user input unit 2007, an interface unit 2008, a memory 2009, and a processor 2010.

A person skilled in the art can understand that the electronic device 2000 may further include a power supply (for example, a battery) that supplies power to the components. The power supply may be logically connected to the processor 2010 by using a power management system, so as to implement functions such as charging management, discharging management, and power consumption management by using the power management system. The electronic device is not limited to the electronic device structure shown in FIG. 20. The electronic device may include more or fewer components than those shown in the figure, or combine some components, or have a different component arrangement. Details are not described herein.

The user input unit 2007 is configured to receive a first input; and
  the processor 2010 is configured to display a target user screen through the display unit 2006 in response to the first input, where a target element of the target user screen is associated with usage information of a target object, where
  the target user screen includes at least one of a Lock Screen, a standby screen, and a prompt screen; and the usage information includes at least one of used duration and remaining available duration.

In some embodiments, in a case that the target user screen is the Lock Screen, the target element includes at least one of first attribute information of a Lock Screen wallpaper, a first image element of the Lock Screen wallpaper, an application icon, and an information prompt card;
  in a case that the target user screen is the standby screen, the target element includes at least one of second attribute information of a Home Screen wallpaper, a second image element of the Home Screen wallpaper, and an application icon; and
  in a case that the target user screen is the prompt screen, the target element includes at least one of a first identifier corresponding to the target object and a second identifier corresponding to the usage information of the target object.

In some embodiments, the target object is an application program;
  in a case that the target user screen is the Lock Screen including the information prompt card, and the information prompt card includes at least one of the first identifier corresponding to the target object and the second identifier corresponding to the usage information of the target object, or in a case that the target user screen is the prompt screen:
  the user input unit 2007 is further configured to receive a second input performed by a user for a target identifier, where the target identifier is the first identifier or the second identifier; and
  the processor 2010 is further configured to start an application program corresponding to the target identifier in response to the second input.

In some embodiments, a quantity of the target objects is greater than 1;
  in a case that the target element includes the first image element of the Lock Screen wallpaper, a quantity of the first image elements is greater than 1, and one first image element is corresponding to one target object; and
  in a case that the target element includes the second image element of the Home Screen wallpaper, a quantity of the second image elements is greater than 1, and one second image element is corresponding to one target object.

In some embodiments, the target element varies with the usage information of the target object.

In some embodiments, the processor 2010 is further configured to: determine, based on a correspondence between the usage information and a level, a target level corresponding to the usage information of the target object; determine, based on a correspondence between the level and a display parameter of the target element, a target display parameter corresponding to the target level; and
  the display unit 2006 is configured to display the target element of the target user screen with the target display parameter.

In some embodiments, the processor 2010 is further configured to: obtain a maximum use duration corresponding to the target object divide the maximum use duration into N levels based on a predetermined step length, where N is a positive integer greater than 1; and establish, for each level, a correspondence between the level and the display parameter of the target element.

The electronic device 2000 in this embodiment of this application displays the target user screen by receiving the first input and being in response to the first input, where the target element of the target user screen is associated with the usage information of the target object. In this way, the user may learn the usage information of the target object through at least one target user screen of the displayed Lock Screen, standby screen, and prompt screen, such as learning at least one of the used duration and the remaining available duration. This avoids the cumbersome process of enabling a plurality of user screens layer by layer to check the usage information, thus simplifying the user operation.

It should be understood that, in this embodiment of this application, the input unit 2004 may include a Graphics Processing Unit (GPU) 20041 and a microphone 20042. The graphics processing unit 20041 processes image data of a static picture or a video obtained by an image capture apparatus (such as a camera) in a video capture mode or an image capture mode. The display unit 2006 may include a display panel 20061, and the display panel 20061 may be configured in a form of a liquid crystal display, an organic light-emitting diode, or the like. The user input unit 2007 includes a touch panel 20071 and another input device 20072. The touch panel 20071 is also referred to as a touchscreen. The touch panel 20071 may include two parts: a touch detection apparatus and a touch controller. The another input device 20072 may include but is not limited to a physical keyboard, a functional button (such as a volume control button or a power on/off button), a trackball, a mouse, and a joystick. Details are not described herein. The memory 2009 may be configured to store a software program and various data, including but not limited to an application program and an operating system. The processor 2010 may be integrated with an application processor and a modem processor. The application processor mainly processes an operating system, a user interface, an application program, and the like, and the modem processor mainly processes wireless communication. It can be understood that the modem processor may not be integrated into the processor 2010.

An embodiment of this application further provides a readable storage medium, where the readable storage medium stores a program or an instruction, and when the program or the instruction is executed by a processor, the processes of the foregoing display method embodiment are implemented, and a same technical effect can be achieved. To avoid repetition, details are not described herein again.

The processor is a processor in the electronic device in the foregoing embodiment. The readable storage medium includes a computer-readable storage medium such as a Read-Only Memory (ROM), a Random Access Memory (RAM), a magnetic disk, or an optical disc.

An embodiment of this application also provides a chip, where the chip includes a processor and a communications interface, and the communications interface is coupled to the processor. The processor is configured to run a program or an instruction to implement the processes of the foregoing display method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not preclude the presence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In some embodiments, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A display method, comprising:
   receiving a first input; and
   displaying a plurality of target elements on a target user screen in response to the first input, wherein each of the plurality of target elements displays to a user the user's time usage duration for using a corresponding target object, wherein the corresponding target object represents an application program, and the user's time usage duration for using the corresponding target object is determined based on an amount of time that the user already spent on using the corresponding target object, wherein each of the plurality of target elements varies with the amount of time that the user already spent on using the corresponding target object, wherein
   the target user screen comprises a Lock Screen or a standby screen, wherein change of information of wallpaper of the Lock Screen or the standby screen indicates change in the user's time usage duration for using each of the corresponding target objects,
   wherein when the target user screen is the Lock Screen comprising an information prompt card, and the information prompt card comprises at least one of a first identifier corresponding to the corresponding target object or a second identifier corresponding to the time usage duration of corresponding the target object, the method further comprises: in response to a second input received on the first identifier or the second identifier, starting the application program corresponding to the target object, wherein before displaying the plurality of target elements on the target user screen in response to the first input, the method further comprises:

dividing the maximum amount of time that the user is allowed to spend on using the corresponding target object into N levels based on a predetermined step length, wherein N is a positive integer greater than 1; and establishing, for each level, a correspondence between the level and a display parameter of the corresponding target element.

2. The display method according to claim 1, wherein when the target user screen is the Lock Screen, each of the plurality of target elements comprises at least one of first attribute information of a Lock Screen wallpaper, a first image element of the Lock Screen wallpaper, an application icon, or the information prompt card; or when the target user screen is the standby screen, each of the plurality of target elements comprises at least one of second attribute information of a Home Screen wallpaper, a second image element of the Home Screen wallpaper, and an application icon.

3. The display method according to claim 2, wherein when the target user screen is the Lock Screen comprising the information prompt card, and the information prompt card comprises at least one of the first identifier corresponding to the corresponding target object or the second identifier corresponding to the time usage duration of corresponding the target object, the method further comprises:

receiving the second input performed by the user for a target identifier, wherein the target identifier is the first identifier or the second identifier.

4. The display method according to claim 1, wherein displaying the plurality of target elements on the target user screen comprises:

determining, based on a correspondence between the time usage duration and a level, a target level corresponding to the time usage duration of the corresponding target object;

determining, based on a correspondence between the level and a display parameter of the corresponding target element, a target display parameter corresponding to the target level; and displaying the plurality of target elements on the target user screen with the target display parameter.

5. The display method according to claim 4, wherein before determining, based on the correspondence between the time usage duration and the level, the target level corresponding to the time usage duration of the corresponding target object, the method further comprises:

obtaining the maximum amount of time that the user is allowed to spend on using the corresponding target object.

6. The display method according to claim 1, wherein the target user screen further comprises a prompt screen, wherein each of the plurality of target elements comprises at least one of the first identifier corresponding to the corresponding target object or the second identifier corresponding to the time usage duration of the corresponding target object.

7. The display method according to claim 6, wherein when the target user screen is the prompt screen, after displaying the plurality of target elements on the target user screen in response to the first input, the method further comprises:

receiving the second input performed by the user for a target identifier, wherein the target identifier is the first identifier or the second identifier; and starting the application program corresponding to the target identifier in response to the second input.

8. An electronic device, comprising a processor; and a memory having a computer program or an instruction stored thereon, wherein the computer program or the instruction, when executed by the processor, causes the processor to perform a display method, comprising:

receiving a first input; and displaying a plurality of target elements on a target user screen in response to the first input, wherein each of the plurality of target elements displays to a user the user's time usage duration for using a corresponding target object, wherein the corresponding target object represents an application program, and the user's time usage duration for using the corresponding target object is determined based on an amount of time that the user already spent on using the corresponding target object, wherein each of the plurality of target elements varies with the amount of time that the user already spent on using the corresponding target object, wherein the target user screen comprises a Lock Screen or a standby screen, wherein change of information of wallpaper of the Lock Screen or the standby screen indicates change in the user's time usage duration for using each of the corresponding target objects, wherein wherein when the target user screen is the Lock Screen comprising an information prompt card, and the information prompt card comprises at least one of a first identifier corresponding to the corresponding target object or a second identifier corresponding to the time usage duration of corresponding the target object, the method further comprises: in response to a second input received on the first identifier or the second identifier, starting the application program corresponding to the target object, wherein before displaying the plurality of target elements on the target user screen in response to the first input, the method further comprises:

dividing the maximum amount of time that the user is allowed to spend on using the corresponding target object into N levels based on a predetermined step length, wherein N is a positive integer greater than 1; and establishing, for each level, a correspondence between the level and a display parameter of the corresponding target element.

9. The electronic device according to claim 8, wherein when the target user screen is the Lock Screen, each of the plurality of target elements comprises at least one of first attribute information of a Lock Screen wallpaper, a first image element of the Lock Screen wallpaper, an application icon, or the information prompt card; or when the target user screen is the standby screen, each of the plurality of target elements comprises at least one of second attribute information of a Home Screen wallpaper, a second image element of the Home Screen wallpaper, and an application icon.

10. The electronic device according to claim 9, wherein when the target user screen is the Lock Screen comprising the information prompt card, and the information prompt card comprises at least one of the first identifier corresponding to the corresponding target object or the second identifier corresponding to the time usage duration of the corresponding target object, the method further comprises:
receiving the second input performed by the user for a target identifier, wherein the target identifier is the first identifier or the second identifier.

11. The electronic device according to claim 8, wherein displaying the plurality of target elements on the target user screen comprises:
determining, based on a correspondence between the time usage duration and a level, a target level corresponding to the time usage duration of the corresponding target object;
determining, based on a correspondence between the level and a display parameter of the corresponding target element, a target display parameter corresponding to the target level; and
displaying the plurality of target elements on the target user screen with the target display parameter.

12. The electronic device according to claim 11, wherein before determining, based on the correspondence between the time usage duration and the level, the target level corresponding to the time usage duration of the corresponding target object, the method further comprises:
obtaining the maximum amount of time that the user is allowed to spend on using the corresponding target object.

13. The electronic device according to claim 8, wherein the target user screen further comprises a prompt screen, wherein each of the plurality of target elements comprises at least one of the first identifier corresponding to the corresponding target object or the second identifier corresponding to the time usage duration of the corresponding target object.

14. The electronic device according to claim 13, wherein when the target user screen is the prompt screen, after displaying the plurality of target elements on the target user screen in response to the first input, the method further comprises:
receiving the second input performed by the user for a target identifier, wherein the target identifier is the first identifier or the second identifier; and
starting the application program corresponding to the target identifier in response to the second input.

15. A non-transitory computer readable storage medium storing a computer program or an instruction that, when executed by a processor, causes the processor to perform a display method, comprising:
receiving a first input; and
displaying a plurality of target elements on a target user screen in response to the first input, wherein each of the plurality of target elements displays to a user the user's time usage duration for using a corresponding target object, wherein the corresponding target object represents an application program, and the user's time usage duration for using the corresponding target object is determined based on an amount of time that the user already spent on using the corresponding target object, wherein each of the plurality of target elements varies with the amount of time that the user already spent on using the corresponding target object, wherein
the target user screen comprises a Lock Screen or a standby screen, wherein change of information of wallpaper of the Lock Screen or the standby screen indicates change in the user's time usage duration for using each of the corresponding target objects,
wherein when the target user screen is the Lock Screen comprising an information prompt card, and the information prompt card comprises at least one of a first identifier corresponding to the corresponding target object or a second identifier corresponding to the time usage duration of corresponding the target object, the method further comprises: in response to a second input received on the first identifier or the second identifier, starting the application program corresponding to the target object,
wherein before displaying the plurality of target elements on the target user screen in response to the first input, the method further comprises:
dividing the maximum amount of time that the user is allowed to spend on using the corresponding target object into N levels based on a predetermined step length, wherein N is a positive integer greater than 1; and
establishing, for each level, a correspondence between the level and a display parameter of the corresponding target element.

16. The non-transitory computer readable storage medium according to claim 15, wherein
when the target user screen is the Lock Screen, each of the plurality of target elements comprises at least one of first attribute information of a Lock Screen wallpaper, a first image element of the Lock Screen wallpaper, an application icon, or the information prompt card; or
when the target user screen is the standby screen, each of the plurality of target elements comprises at least one of second attribute information of a Home Screen wallpaper, a second image element of the Home Screen wallpaper, and an application icon.

17. The non-transitory computer readable storage medium according to claim 16, wherein
when the target user screen is the Lock Screen comprising the information prompt card, and the information prompt card comprises at least one of the first identifier corresponding to the corresponding target object or the second identifier corresponding to the time usage duration of the corresponding target object, the method further comprises:
receiving the second input performed by the user for a target identifier, wherein the target identifier is the first identifier or the second identifier.

18. The non-transitory computer readable storage medium according to claim 15, wherein displaying the plurality of target elements on the target user screen comprises:
determining, based on a correspondence between the time usage duration and a level, a target level corresponding to the time usage duration of the corresponding target object;
determining, based on a correspondence between the level and a display parameter of the corresponding target element, a target display parameter corresponding to the target level; and
displaying the plurality of target elements on the target user screen with the target display parameter.

19. The non-transitory computer readable storage medium according to claim 18, wherein before determining, based on the correspondence between the time usage duration and the level, the target level corresponding to the time usage duration of the corresponding target object, the method further comprises:

obtaining the maximum amount of time that the user is allowed to spend on using the corresponding target object.

20. The non-transitory computer readable storage medium according to claim 15, wherein the target user screen further comprises a prompt screen, wherein each of the plurality of target elements comprises at least one of the first identifier corresponding to the corresponding target object or the second identifier corresponding to the time usage duration of the corresponding target object.

21. The non-transitory computer readable storage medium according to claim 20, wherein when the target user screen is the prompt screen, after displaying the plurality of target elements on the target user screen in response to the first input, the method further comprises:

receiving the second input performed by the user for a target identifier, wherein the target identifier is the first identifier or the second identifier; and starting the application program corresponding to the target identifier in response to the second input.

* * * * *